(12) United States Patent
Pu et al.

(10) Patent No.: US 11,853,242 B2
(45) Date of Patent: Dec. 26, 2023

(54) SYNCHRONIZATION CONTROL METHOD, CHIP, ELECTRONIC DEVICE AND STORAGE MEDIUM

(71) Applicant: SHENZHEN GOODIX TECHNOLOGY CO., LTD., Guangdong (CN)

(72) Inventors: Chuan Pu, Guangdong (CN); Dingfu Lian, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 210 days.

(21) Appl. No.: 17/562,736

(22) Filed: Dec. 27, 2021

(65) Prior Publication Data

US 2022/0300444 A1 Sep. 22, 2022

(30) Foreign Application Priority Data

Mar. 18, 2021 (CN) .......................... 202110291510.9

(51) Int. Cl.
  *G06F 13/362* (2006.01)
  *G06F 9/48* (2006.01)
  *G06F 13/40* (2006.01)

(52) U.S. Cl.
  CPC .......... *G06F 13/3625* (2013.01); *G06F 9/485* (2013.01); *G06F 13/405* (2013.01)

(58) Field of Classification Search
  None
  See application file for complete search history.

(56) References Cited

U.S. PATENT DOCUMENTS

2006/0140575 A1* 6/2006 Fuchigami ........... G11B 27/034
2013/0198292 A1 8/2013 Aaltonen et al.
(Continued)

FOREIGN PATENT DOCUMENTS

| CN | 110932815 A | 3/2020 |
| CN | 111819891 A | 10/2020 |
| CN | 112105005 A | 12/2020 |

(Continued)

OTHER PUBLICATIONS

Shenzhen Goodix Technology Co.,Ltd., CN Intention to Grant with English translation, CN 202110291510.9, dated Nov. 16, 2022, 7 pgs.

(Continued)

*Primary Examiner* — Michael Sun
(74) *Attorney, Agent, or Firm* — Nicholas Mesiti, Esq.; Heslin Rothenberg Farley & Mesiti PC

(57) ABSTRACT

Provided are a synchronization control method, a chip, an electronic device and a storage medium. A master device sets a reference time for a plurality of slave devices wirelessly connected to the master device; and determines a target count value K of a connection event and an offset time of a respective slave device for each of the plurality of slave devices. The master device transmits the target count value of the connection event and the offset time to the respective slave device, so that each of the plurality of slave devices performs control based on the target count value of the connection event and the offset time of the respective slave device, so as to perform a task at the reference time.

20 Claims, 20 Drawing Sheets

(56) References Cited

U.S. PATENT DOCUMENTS

2013/0325928 A1* 12/2013 Milburn ............... G11B 27/034
                                                              709/203
2015/0092642 A1*  4/2015 Geboff ................. H04L 69/329
                                                              370/350

FOREIGN PATENT DOCUMENTS

RU              2738446 C1      12/2020
WO           2020133183 A1       7/2020

OTHER PUBLICATIONS

Dakun Liu, et al., Cooperative Time Synchronization Optimization Algorithm for Wireless Ad Hoc Networks, Acta Armamentarii, Apr. 15, 2020, 9 pgs.
Shenzhen Goodix Technology Co.,Ltd., Extended European Search Report, EP 21217869.3, dated Jun. 17, 2022, 8 pgs.

* cited by examiner

SYNCHRONIZATION CONTROL METHOD, CHIP, ELECTRONIC DEVICE AND STORAGE MEDIUM

CROSS-REFERENCE TO RELATED APPLICATION

The present application claims the benefit of priority under the Paris Convention to Chinese Patent Application No. 202110291510.9 filed on Mar. 18, 2021, which is incorporated herein by reference in its entirety.

TECHNICAL FIELD

The present disclosure relates to the field of wireless communication technology, and in particular to a synchronization control method, a chip, an electronic device and a storage medium.

BACKGROUND

Currently, the Bluetooth low energy (BLE) technology is a short-distance wireless communication technology commonly applied. Generally, a piconet may be formed between BLE devices. There are one master device and one or a plurality of slave devices in one piconet. Bluetooth connection may be established separately between the master device and the plurality of slave devices. There is, however, no connection between any two slave devices. Generally, the master device and the slave device may communicate with each other based on an asynchronous connection-oriented (ACL) logical transport link.

Although Bluetooth connection may be simultaneously established between the master device and the plurality of slave devices, data transmission only can be performed between the master device and one of the plurality of slave devices at one time point. That is, the master device is not able to simultaneously transmit control information to the plurality of slave devices, nor can the master device simultaneously receive data transmitted from the plurality of slave devices. Therefore, in the piconet, synchronization of the plurality of slave devices is not satisfying.

SUMMARY

The present disclosure is directed to provide a synchronization control method, a chip, an electronic device and a storage medium that can improve synchronization of a plurality of devices in performing tasks in a network.

In order to address the technical problem, in one aspect, some embodiments of the present disclosure provide a synchronization control method applied to a master device. The method includes a computing operation and a transmission operation. Herein, the computing operation includes: setting a first reference time for a plurality of slave devices wirelessly connected to the master device; and for each of the plurality of slave devices, determining a target count value K of a connection event and an offset time of a respective slave device. Herein, an offset time of a slave device refers to a time difference between the first reference time and a start time of a $K^{th}$ connection event of the slave device. Alternatively, the computing operation includes: selecting one a plurality of slave devices, setting a target count value K of a connection event of a selected slave device, and setting an offset time of the selected slave device as zero. Herein, a start time of a $K^{th}$ connection event of the selected slave device is taken as a second reference time; and for each unselected slave device in the plurality of slave devices, determining a target count value K of a connection event and an offset time of a respective unselected slave device. Herein, an offset time of an unselected slave device refers to a time difference between the second reference time and a start time of a $K^{th}$ connection event of the unselected slave device. The transmission operation includes: for each of the plurality of slave devices, transmitting the target count value K of the connection event and the offset time to a respective slave device, so that the respective slave device performs control based on the target count value K of the connection event and the offset time, so as to perform a task at the first or second reference time.

In a second aspect, some embodiments of the present disclosure provide a synchronization control method applied to a slave device. The method includes: receiving a target count value K of a connection event and an offset time of the slave device transmitted from a master device. Herein, the offset time of the slave device refers to a time difference between a reference time preset by the master device and a start time of a Kth connection event of the slave device. The method includes: checking whether the reference time is overdue according to the target count value of the connection event. In response to the reference time being not overdue, control is performed based on the target count value of the connection event and the offset time, so as to perform a task at the reference time.

In a third aspect, some embodiments of the present disclosure provide a synchronization control method. In the method, a master device performs a computing operation. The computing operation includes: setting a first reference time for a plurality of slave devices wirelessly connected to the master device; and for each of the plurality of slave devices, determining a target count value K of a connection event and an offset time of a respective slave device. Herein, an offset time of a slave device refers to a time difference between the first reference time and a start time of a $K^{th}$ connection event of the slave device. Alternatively, the computing operation includes: selecting one of a plurality of slave devices, setting a target count value K of a connection event of a selected slave device, and setting an offset time of the selected slave device as zero. Herein, a start time of a $K^{th}$ connection event of the selected slave device is taken as a second reference time. The computing operation further includes: for each unselected slave device in the plurality of slave devices, determining a target count value K of a connection event and an offset time of a respective unselected slave device. Herein, an offset time of an unselected slave device refers to a time difference between the second reference time and a start time of a $K^{th}$ connection event of the unselected slave device. In the method, the master device performs a transmission operation. The transmission operation includes: for each of the plurality of slave devices, transmitting the target count value K of the connection event and the offset time to a respective slave device. In the method, each of the plurality of slave devices performs the following operations: receiving the target count value K of the connection event and the offset time transmitted by the master device; checking whether the first or second reference time is overdue according to the target count value of the connection event; and performing control based on the target count value of the connection event and the offset time in response to the first or second reference time being not overdue, so as to perform a task at the first or second reference time.

In a fourth aspect, some embodiments of the present disclosure provide a chip including: a processor part and a storage part. The storage part stores an instruction executable by the processor part. The instruction, when executed by the processor part, causes the processor part to implement the synchronization control method. Herein, the chip serves as a master device or a slave device.

In a fifth aspect, some embodiments of the present disclosure provide an electronic device including: at least one processor; and a memory in communication with the at least one processor. Herein, the memory stores an instruction executable by the at least one processor. The instruction, when executed by the at least one processor, causes the at least one processor to implement the synchronization control method. Herein, the electronic device serves as a master device or a slave device.

In a sixth aspect, some embodiments of the present disclosure provide a computer-readable storage medium storing a computer program. Herein, when executed by a processor, the computer program implements the synchronization control method described in the above.

In the embodiments of the present disclosure, compared with existing technologies, after connection is established between the master device and the plurality of slave devices, a common reference time is determined for the plurality of slave devices, and the target count value K of the connection event and the offset time is determined for each slave device. Because the offset time of the slave device refers to the time difference between the reference time and the start time of the $K^{th}$ connection event of the slave device, for each slave device, a time point resulted from the start time of the $K^{th}$ connection event of the respective slave device superimposed with the offset time of the respective slave device may indicate the reference time set by the master device. That is, each slave device has only to perform control based on a received target count value K and the offset time to determine the arrival of the reference time, and tasks are started at the reference time, so as to improve synchronization of performing the task by the plurality of slave devices.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings are denoted as similar elements. The figures in the accompanying drawings do not constitute a proportion limitation unless otherwise stated.

DETAILED DESCRIPTION

Figure 1:
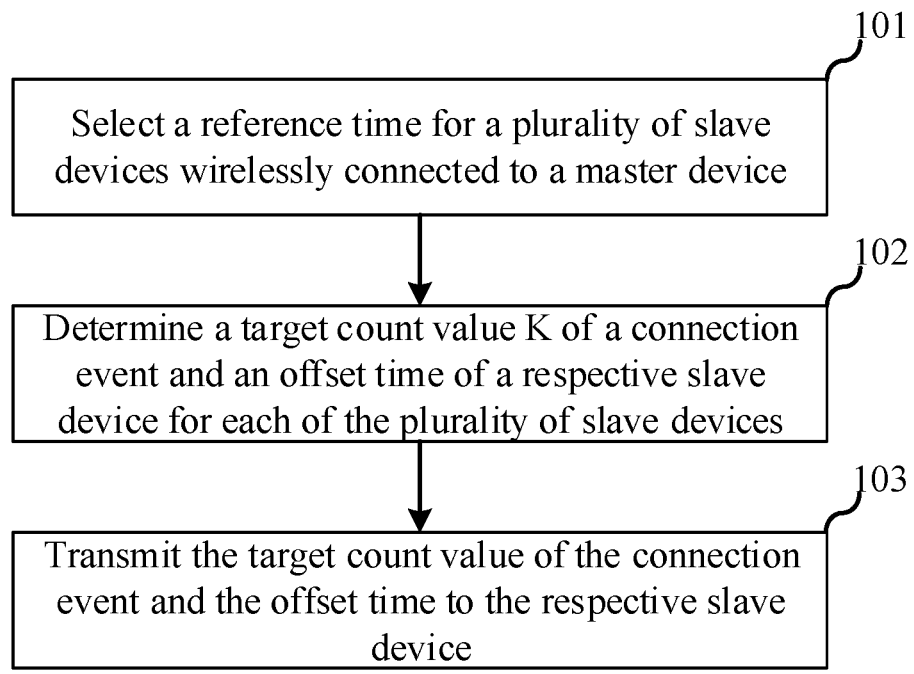
FIG. 1 is a flow chart showing a synchronization control method implemented by a master device according to an embodiment of the present disclosure.

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure can be implemented without these technical details and based on various changes and modifications of the following embodiments. The following embodiments are divided to facilitate description, and shall not constitute any limitation to specific implementation of the present disclosure. The embodiments may be combined and refer to each other without any contradiction.

In a piconet established by BLE devices, a master device and a slave device may communicate based on a conventional BLE ACL link. Specifically, communication is performed based on a connection event of an ACL link. After connection is established between the master device and the slave device, frequency hopping may occur constantly. Each time the frequency hopping occurs, one connection event occurs, and a count value of the connection event is increased by one. The slave device and the master device each has a connection event counter. The connection event counter in either the slave device or the master device may synchronously count connection events of the ACL link. Each connection event has a duration. The master device and the slave device transmit data within the duration of each connection event. There is an interval between two connection events. The interval is called as a connection event period of the ACL link. In the piconet, an independent ACL link is established between the master device and each slave device. That is, each slave device corresponds to a unique ACL link. Therefore, a connection event of an ACL link where a slave device is located may also be called as a connection event of the slave device. A connection event period of an ACL link where a slave device is located may also be called as a connection event period of the slave device.

For a BLE device, there may be a large amount of application scenarios where a piconet may be established based on an ACL link.

For example, in a scenario where multiple audio sources provide data such as an audio dialogue among multiple persons and singing of multiple persons, each person holds an audio collection device like a microphone that collects and transmits audio data in a data frame form to a master. A host machine composes and plays the audio data collected from multiple audio collection devices. Herein, the multiple audio collection devices are a plurality of slave devices, and the host machine is a master device. It is difficult for multiple audio collection devices to synchronously start collection. Therefore, data frames with the same sequence number transmitted from the plurality of audio collection devices to the host machine may not be data collected within one time period. When the host machine composes and plays the data frames with the same sequence number transmitted by different audio collection devices, an original sound may not be displayed authentically.

For another example, in a multimedia teaching system, each student has one terminal device for playing audio/video and for receiving teaching audio/video data transmitted by a master. It is difficult for multiple terminal devices to synchronously receive teaching audio/video data transmitted by the master. Therefore, it is difficult to synchronously play teaching audio/video data, especially when there are a large number of terminal devices (i.e. when there are a large number of students) and synchronization of all terminal devices may be poor.

In embodiments of the present disclosure, a master device and a plurality of slave devices cooperate with each other to achieve synchronization control over the plurality of slave devices by the master device. The plurality of slave devices refer to two or more slave devices. The master device and each of the plurality of slave devices may communicate with each other based on a BLE ACL link. It shall be denoted that though description in the embodiments is provided through communication based on the BLE ACL link, the present disclosure is not limited to this. All communication manners based on any communication protocol of performing communication in response to connection-oriented and connection event are adaptive to the synchronization control method in the present disclosure.

In one embodiment, a synchronization control method as shown in FIG. 1 is applied to a master device. The method includes a computing operation and a transmission operation. The computing operation includes 101 and 102. The transmission operation includes 103.

In 101, a reference time is set for a plurality of slave devices wirelessly connected to the master device.

In 102, for each of the plurality of slave devices, a target count value K of a connection event and an offset time of a respective slave device are determined. Herein, an offset time of a slave device refers to a time difference between the reference time and a start time of a $K^{th}$ connection event of the slave device.

In 103, for each of the plurality of slave devices, the target count value of the connection event and the offset time of the respective slave device are transmitted to the respective slave device.

Figure 2:
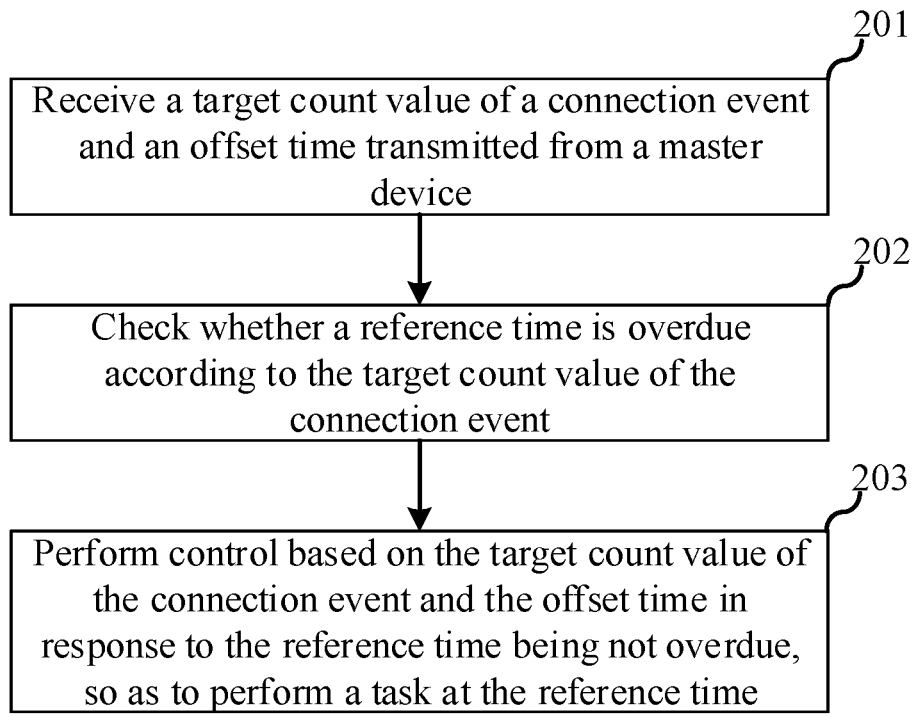
FIG. 2 is a flow chart showing a synchronization control method implemented by a slave device according to an embodiment of the present disclosure.

In one embodiment, as shown in FIG. 2, a synchronization control method is applied to a slave device, including the following operations.

In 201, a target count value of a connection event and an offset time of the slave device transmitted from a master device are received. Herein, the offset time of the slave device refers to a time difference between a reference time preset by a master device and a start time of a $K^{th}$ connection event of the slave device.

In 202, whether the reference time is overdue is checked according to the target count value of the connection event.

In 203, control is performed based on the target count value of the connection event and the offset time when the reference time is not overdue, so as to perform a task at the reference time.

In embodiments of the present disclosure, after connection is established between a master device and a plurality of slave devices, a common reference time is designated for the plurality of slave devices, and a target count value K of a connection event and an offset time is determined for each of the plurality of slave devices. Because an offset time of a slave device refers to a time difference between the reference time and a start time of a $K^{th}$ connection event of the slave device, for each of the plurality of slave devices, a time point resulted from the start time of the $K^{th}$ connection event of the slave device superimposed with the offset time of the slave device may indicate the reference time set by the master device. That is, each of the plurality of slave devices has only to perform control based on a received target count value K and offset time to determine arrival of the reference time, and tasks are started at the reference time, so as to improve synchronization of performing a task by a plurality of slave devices.

For example, in the scenario where multiple audio sources provide data such as an audio dialogue among multiple persons and singing of multiple persons as mentioned above, each audio collection device may perform control based on a target count value and an offset time transmitted by the host machine, so that at the reference time, collection of audio data frames may also be started, and collected audio data frames may be transmitted to the host machine in a collection order. In this way, it may be ensured as much as possible that data frames having the same sequence number are collected within the same time period. Therefore, the host machine composes and plays the data frames having the same sequence number transmitted by different audio collection devices, and can display the original sound more authentically.

For another example, in the multimedia teaching system mentioned above, the terminal devices can not receive completely the same teaching audio/video data at one time point, but the terminal devices may perform control based on a target count value and an offset time transmitted by the master. Therefore, at the reference time, the terminal devices start to play teaching audio/video data received so as to achieve synchronous teaching.

Figure 3A:
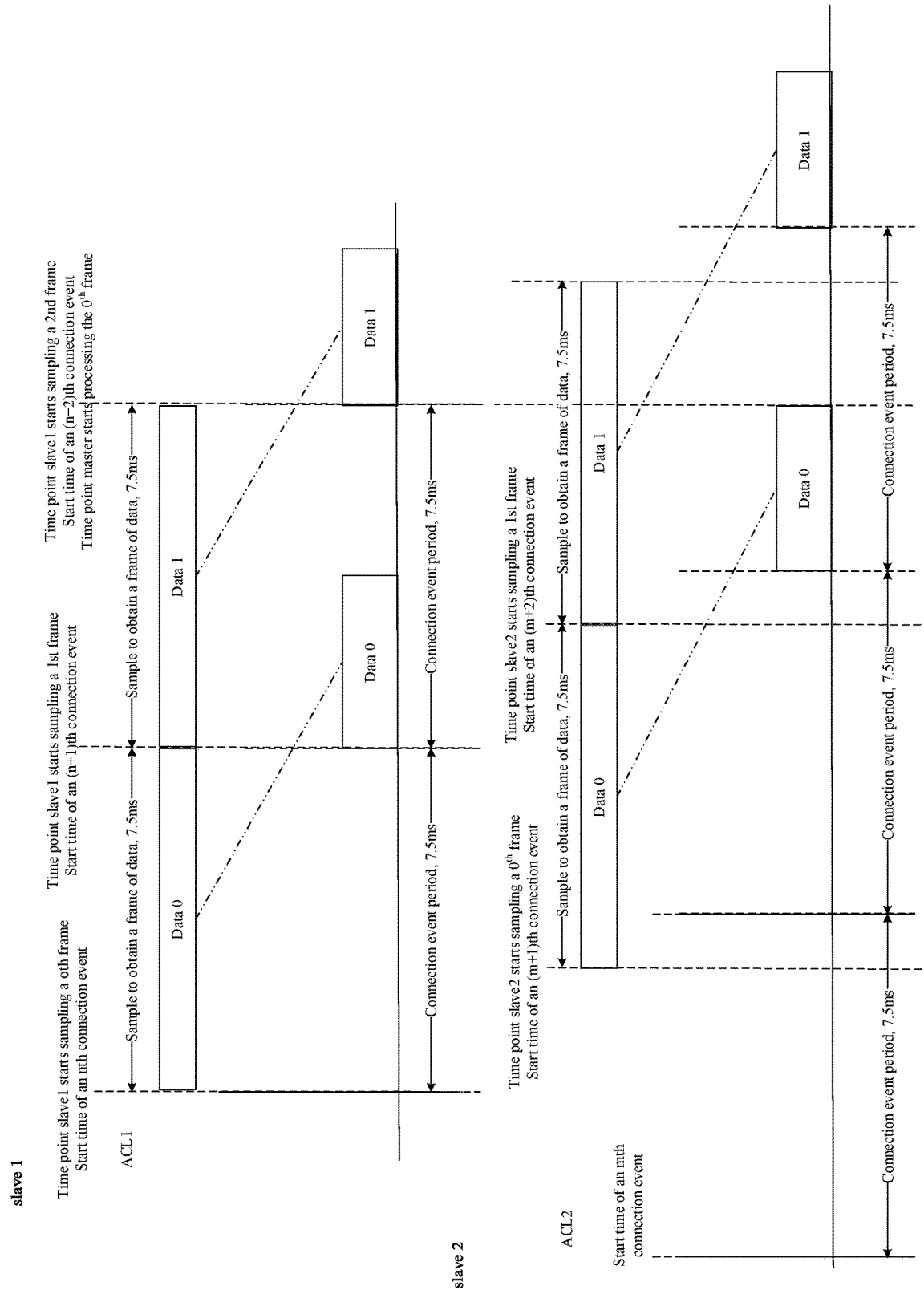
FIGS. 3A and 3B are schematic diagrams showing processes that slave devices collect and transmit data frames respectively in cases where no reference time is set by a master device and where a reference time is set by the master device in a scenario where multiple audio sources provide data.
Figure 3B:
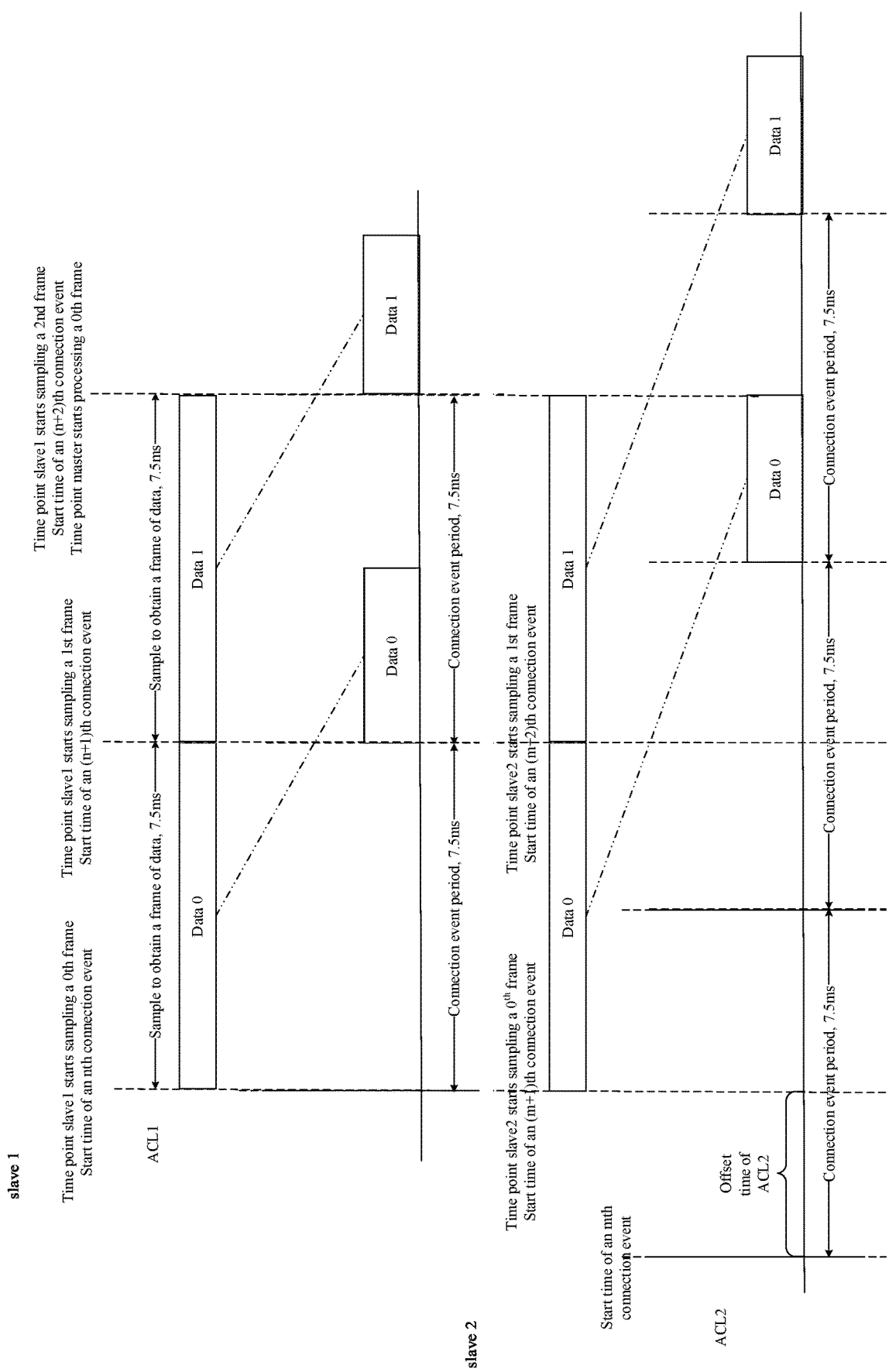

As an example, FIGS. 3A and 3B are schematic diagrams showing processes that a slave device collects and transmits data frames respectively in cases where a reference time is not set by a master device and where a reference time is set by the master device in a scenario where multiple audio sources provide data. The scenario where multiple audio sources provide data may, for example, be two persons singing. Microphones in the two persons' hands are two slave devices (e.g. slave1 and slave2). The host machine is a master device (e.g. master). An ACL link between slave1 and master is denoted as ACL1, and an ACL link between slave2 and master is denoted as ACL2. Connection event periods of slave1 and slave2 are the same, i.e., 7.5 ms. Slave1 and slave2 respectively and independently sample audio data frames and transmit the audio data frames to master. Sampling and transmission processes are illustrated as follows. After sampling starts, Date0, Date1, Date3 . . . are obtained. Herein, Date0 denotes a $0^{th}$ frame of audio data, Date1 denotes a $1^{st}$ frame of audio data, Date2 denotes a $2^{nd}$ frame of audio data (the drawings show only Date0 and Date1). A collection time required by each frame of audio data is equal to a respective connection event period of each of the plurality of slave devices, e.g., to sample one frame of data 7.5 ms as shown in the drawings. After one frame of audio data is obtained through sampling, the frame of audio data is transmitted to the master device in a next connection event period. As show in the figures, during transmission of slave1, two positions indicated by two ends of a dotted line of Data0, are the connection event period corresponding to obtaining Date0 through sampling and the connection event period where transmitting Date0 is located, respectively. Herein, slave1 and ACL1, slave2 and ACL2 as shown in the following schematic diagrams denote two slave devices and corresponding links, and master denotes the master device.

In FIG. 3A, in a case where no reference time is set by the master device, time points at which slave1 and slave2 start to sample the $0^{th}$ frame are different. That is, slave1 and slave2 do not start sampling synchronously, causing that time points at which each of following frames starts sampling are different. Therefore, a sampling time period corresponding to Date0 of slave1 is different from a sampling time period corresponding to Date0 of slave2 and a sampling time period corresponding to Date1 of slave1 is different from a sampling time period corresponding to Date1 of slave2. That is, for the same $i^{th}$ frame of audio data, i.e., Datai, different slave device correspond to different sampling time periods, i=0, 1, 2, . . . . If master directly combines and plays Datai of slave1 and Datai of slave2, sound rendered may be inconsistent with a real sound. For example, for one section of lyric, it is heard that one person sings first and the other person sings later, but in fact, the two persons sang synchronously. If master desires that data after a combining process is completely the same with the fact, each frame of audio data received from slave1 and slave2 has to be disassembled and analyzed, for example, through waveform comparison. Audio data sampled during one time period are identified and then composed. Evidently, this would increase processing time for master, so that an entire waiting time from audio data collection to sound output is lengthened. Besides, this would add complexity and burden of processing on the master.

In FIG. 3B, in a case where the reference time is set by the master device, both slave1 and slave2 start sampling at the reference time, i.e., time points at which the $0^{th}$ frame is sampled are the same, and time points at which each frame is started to be sampled are the same. Therefore, Date0 of slave1 and Date0 of slave2 correspond to the same sampling time period and Date1 of slave1 and Date1 of slave2 correspond to the same sampling time period. That is, for the same $i^{th}$ frame of audio data, i.e., Datai, different slave devices correspond to the same sampling time period. Therefore, master receives, directly combines and plays the $i^{th}$ frame of audio data of slave1 and slave2. There may not be the case where played audio differ from real sound caused by different sampling start times.

It is known from the above analysis that in a scenario where a plurality of slave devices need to collect and transmit data to the master device to perform composition, unification of a start time point of sampling may improve synchronization of data collection by the plurality of slave device, and authenticity of audio after combination by the master device may be improved. In addition, a problem of extra cost on processing by the master device caused by insufficient synchronization of data sampling by the plurality of slave devices may be avoided. Besides, a processing speed of the master device is improved. That is, timeliness of data transmission in an entire piconet may be improved.

Each slave device has to start to perform tasks at a common reference time. The reference time shall be a time point in the future. In an embodiment, the reference time set by the master device is later than the current time of the master device, that is, the set reference time is a time point in the future. Further, for each slave device, the reference time is later than a start time of a $K^{th}$ connection event of a respective slave device. That is, it is the reference time, after the start time of the $K^{th}$ connection event is delayed by the offset time. Because the target count value and offset time of the connection event determined by the master device for each slave device indicate the set reference time, the slave device may directly perform control based on the received target count value and offset time after the target count value and the offset time are transmitted to the slave device. Specifically, the slave device starts time monitoring based on a local clock after the slave device detects that the current count value of the connection event reaches the target count value. When the offset time is monitored to be delayed, it is considered that it is the reference time set by the master device, and here, the task is started to be performed.

Further, the offset time of the slave device is less than the connection event period of the slave device. Herein, when the slave device performs control based on the target count value of the connection event and the offset time, increase of the connection event in the slave device is synchronous with that in the master device, i.e., the clock of the slave device being aligned with the clock of the master device, and generally no deviation would occur. Besides, control on the offset time is monitored and implemented by the local clock of the slave device. There may be slight deviation in local clocks of different slave devices, a shorter offset time leads to a lower possibility of asychronization caused by deviation of a local clock. For example, if a period T of one slave device is 1 second, a reference time indicated by a target count value of 112 and an offset time of 1500 milliseconds is equivalent to a reference time indicated by a target count value of 113 and an offset time of 500 milliseconds. However, when the slave device performs control based on the target count value of 113 and the offset time of 500 milliseconds, it is less likely that asynchronization would occur due to a local clock deviation. In another embodiment, the reference time set by the master device may further be a time point in the past, and the reference time may further be later than the start time of the $K^{th}$ connection event of the slave device.

Whether the reference time set by the master device is a future time point or not, for each slave device, as shown in FIG. 2, after receiving the target count value of the connection event and the offset time transmitted by the master device, it is desired to check whether the reference time is overdue according to the target count value, so as to ensure that the control can be performed based on the received target count value and the offset time. Therefore, even if what the master device set is a future time point when setting the reference time, a time point at which the slave device receives the target count value and the offset time may be past the reference time due to a time delay during a process when the target count value and the offset time are transmitted to the slave device.

In addition, even if the reference time indicated by the target count value and the offset time is a future time, if the reference time set by the master device is earlier than the start time of the $K^{th}$ connection event of the slave device, this indicates that a time point is not the reference time unless the time point is obtained by subtracting the offset time from the start time of the $K^{th}$ connection event. Here, the slave device needs to readjust a value of the target count value K and a value of the offset time, update the target count value K to K−1, and update the offset time to a value obtained by subtracting the offset time from the connection event period. For example, the connection event period of the slave device is 1 second. Before adjustment, i.e., in a case where the reference time is earlier than the start time of the $K^{th}$ connection event of the slave device, the target count value K is 135, and the offset time is 300 milliseconds before the start time of the $K^{th}$ connection event. After the adjustment, the target count value K is updated to K=K−1=135−1=134, and the offset time offset is updated to offset=1 second−300 milliseconds=700 milliseconds. That is, the offset time offset is 700 milliseconds after the start time of the $K^{th}$ connection event.

Figure 4:
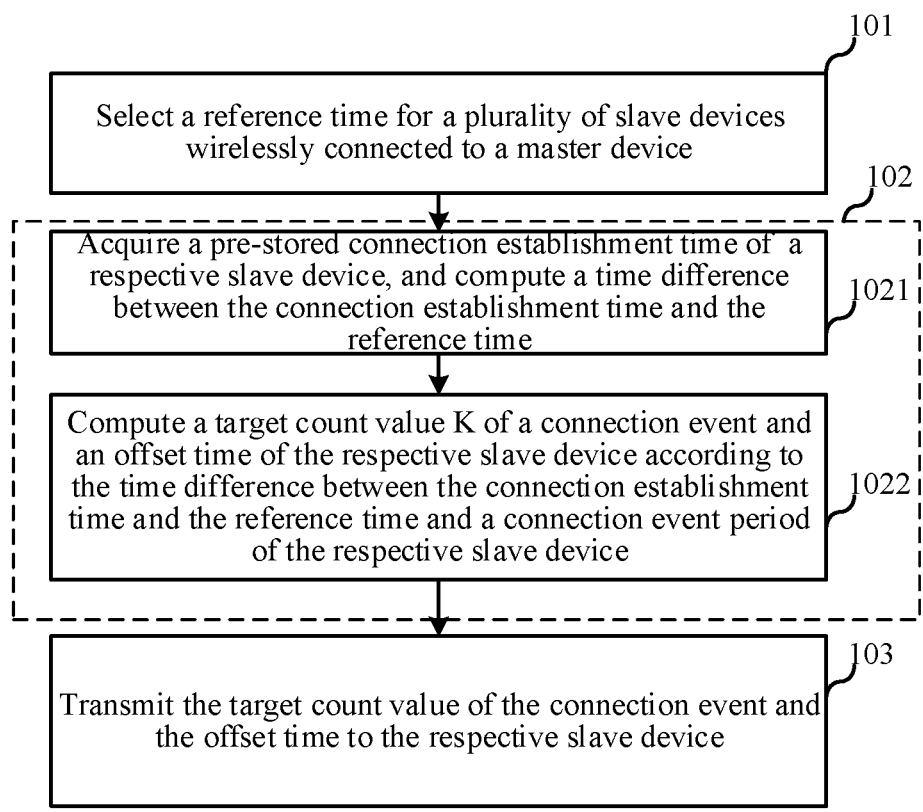
FIG. 4 is a flow chart showing that a master device computes a target count value K and an offset time according to an embodiment of the present disclosure.

In an embodiment, one computing manner of the target count value K and the offset time of the connection event of each slave device is provided. As shown in FIG. 4, for each of the plurality of slave devices, operation 102 is performed as follows.

In 1021, a connection establishment time pre-stored in a slave device is acquired, and a time difference between the connection establishment time and the reference time is computed. Herein, the connection establishment time refers to a time of establishing connection between the slave device and the master device.

In 1022, the target count value K of the connection event and the offset time of the slave device are computed according to the time difference between the connection establishment time and the reference time and the connection event period of the slave device.

Specifically, when connection is established between the master device and each slave device, a time when the connection is established is recorded as a connection establishment time of the slave device. For each slave device, the time difference between the connection establishment time and the reference time is denoted as $\Delta t1$, $\Delta t1 = t - t0$. Herein, t denotes the reference time, t0 denotes the connection establishment time. $\Delta t1$ is divided by a connection event period T, to obtain a quotient K and a remainder offset, i.e., $\Delta t1/T = K \ldots$ offset. Herein, K denotes the target count value of the connection event, and offset denotes the offset time. Because offset is a reminder of $\Delta t1/T$, offset is less than the connection event period T.

For example, connection is established respectively between the master device (e.g. master) and the two slave device (e.g. slave1 and slave2). The connection between master and slave1 is established at 10 minutes 00 second (10m00 s, and minute, second and millisecond are hereinafter respectively referred to as "m", "s" and "ms") of master's time, and the connection event period here is 1 s. The connection between master and slave2 is established at 11m05 s of master's time, and the connection event period here is 2 s.

In a supposed case one, master sets 11m55 s as the reference time. For slave1, $\Delta t1$ is 115 seconds, the target count value K is 115, the offset time offset is 0. For slave2, $\Delta t1$ is 50 seconds, the target count value is 25, and the offset time offset is 0.

In a supposed case two, master sets 11m54 s500 ms as the reference time. For slave1, $\Delta t1$ is 114 s500 ms, the target count value K is 114, and offset is 500 ms. For slave2, $\Delta t1$ is 49 s500 ms, the target count value K is 24, and the offset time offset is 1500 ms.

Figure 5:
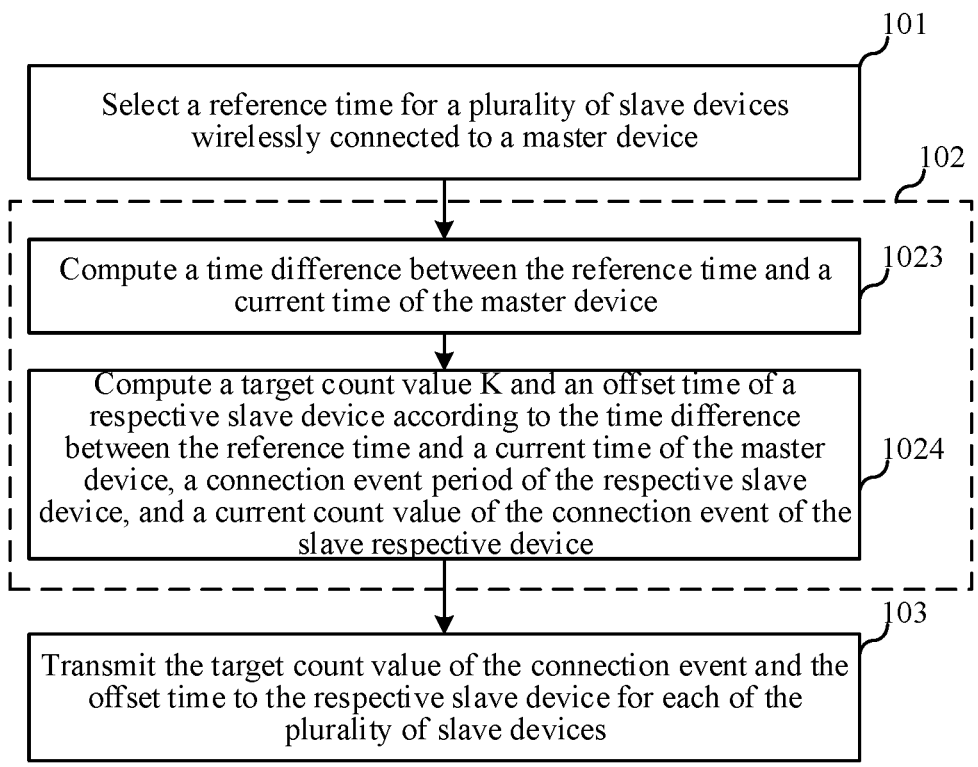
FIG. 5 is a flow chart showing that a master device computes a target count value K and an offset time according to another embodiment of the present disclosure.

In an embodiment, another computing manner for the target count value K of the connection event and the offset time of each slave device is provided. As shown in FIG. 5, for each of the plurality of slave devices, operation 102 is performed as follows.

In 1023, a time difference between a reference time and a current time of the master device is computed.

In 1024, a target count value K and an offset time of a slave device is computed according to the time difference between the reference time and the current time of the master device, a connection event period of the slave device, and a current count value of the connection event of the slave device.

Specifically, a time difference between a reference time t and a current time t1 of the master device is denoted as $\Delta t2$. In a case where the reference time t is later than the current time t1, $\Delta t2 = t - t1$. For each slave device, $\Delta t2$ is divided by a connection event period T to obtain a quotient $\Delta k$ and a remainder offset, i.e., $\Delta t2/T = \Delta k \ldots$ offset, and the target count value K is computed by $K = K0 + \Delta k$. Herein, K0 denotes the current count value of the connection event. $\Delta k$ may be understood as a number of connection event periods included in the time difference between the reference time t and the current time t1. Offset denotes the offset time. Because offset is the remainder of $\Delta t2/T$, offset is less than the connection event period T.

For example, connection is established respectively between the master device (e.g. master) and two slave devices (e.g. slave1 and slave2). The current time of the master device is 10m20 s. A connection event period of slave1 is 1 s and a current count value of slave1 is 35. A connection event period of slave2 is 2 s, and the current count value is 64.

In a supposed case one, master sets 11m55 s as the reference time. Here, the time difference Δt2 between the reference time and the current time of the master device is 95 s. For slave1, the target count value K is 130, the offset time offset is 0. For slave2, the target count value K is 111, and the offset time offset is 1 s.

In a supposed case two, master sets 11m54 s500 ms as the reference time. Here, the time difference Δt2 between the reference time and the current time of the master device is 94 s500 ms. For slave1, the target count value K is 129, the offset time offset is 500 ms. For slave2, the target count value K is 111, and the offset time offset is 500 ms.

Figure 6:
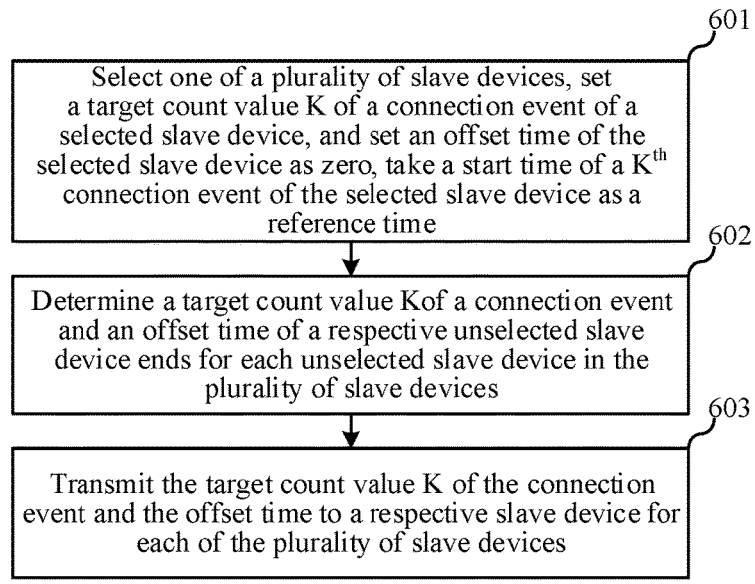
FIG. 6 is a flow chart showing that a master device sets a reference time according to an embodiment of the present disclosure.

In an embodiment, as shown in FIG. 6, operations 601 to 603 are included.

In 601, one slave device is selected from a plurality of slave devices, a target count value K of a connection event of a selected slave device is set, and an offset time of the selected slave device is set as zero. Herein, a start time of a $K^{th}$ connection event of the selected slave device is taken as a reference time.

In 602, for each unselected slave device in the plurality of slave devices, a target count value K of a connection event and an offset time of a respective unselected slave device are determined. Herein, an offset time of an unselected slave device refers to a time difference between the reference time and a start time of a $K^{th}$ connection event of the unselected slave device.

In 603, for each of the plurality of slave devices, the target count value K of the connection event and the offset time are transmitted to a respective slave device, so that the respective slave device performs control based on the target count value K of the connection event and the offset time, so as to perform a task at the reference time.

In the embodiment, the target count value K of the connection event and the offset time of the selected slave device are preset. Then only the target count value K of the connection event and the offset time of each unselected slave device in the plurality of slave devices may be computed, thereby data computing is reduced. Herein, the target count value K and the offset time of each unselected slave device are computed in a similar manner as shown in FIG. 4 or FIG. 5. That is, operation 602 is similar to operation 102 in FIG. 4 or FIG. 5, and operation 603 is similar to operation 103 in FIG. 4 or FIG. 5.

Figure 7A:
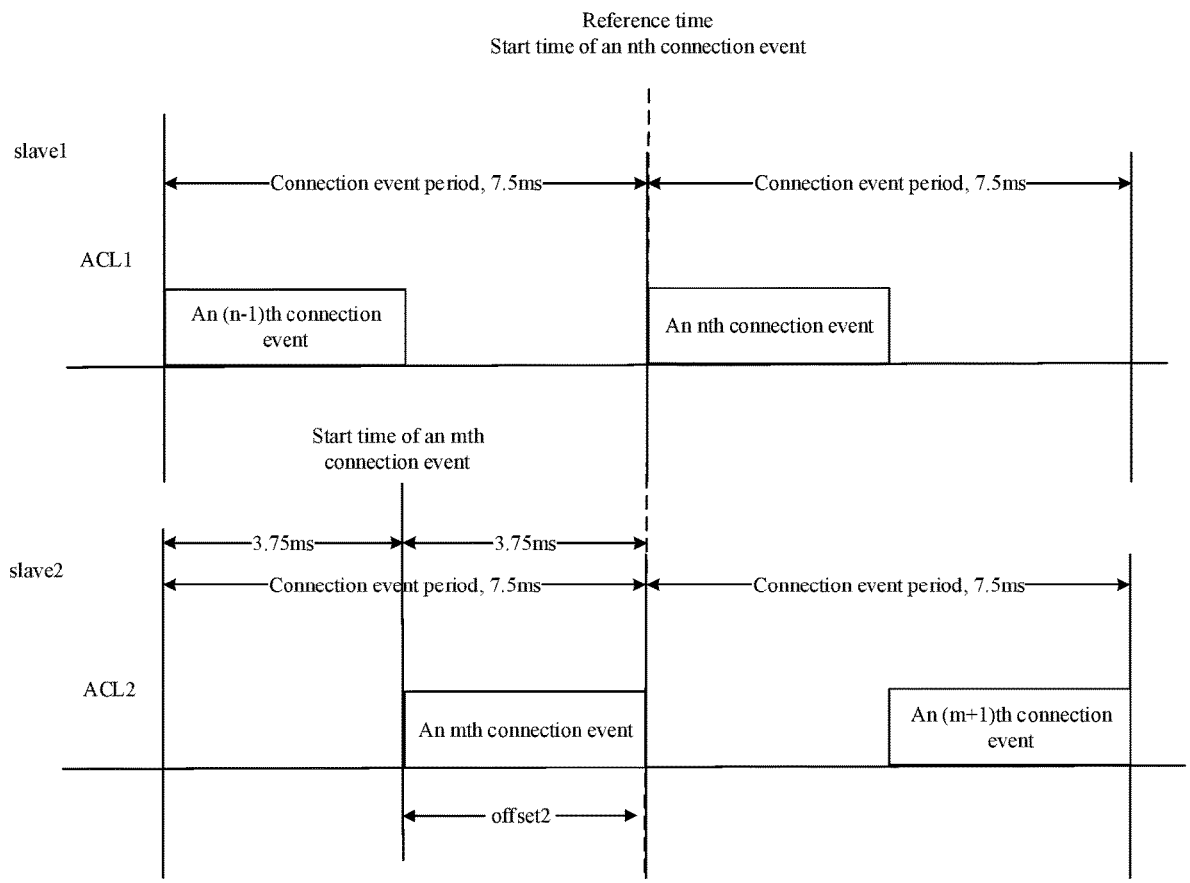
FIG. 7A and FIG. 7B are schematic diagrams showing two cases where a master device sets a reference time.

For example, as shown in FIG. 7A, there are two slave devices, slave1 is the selected slave device and slave2 is the unselected slave device. In FIG. 7A, an $(n-1)^{th}$ connection event and an $n^{th}$ connection event are used to indicate any two successive connection events in ACL1. N is a natural number greater than or equal to 1. Similarly, an $(m-1)^{th}$ connection event and an $m^{th}$ connection event are used to indicate any two successive connection events in ACL2. m is a natural number greater than or equal to 1. Connection event periods of ACL1 and ACL2 are both 7.5 ms, and duration of the connection event is 3.75 ms. Master sets the target count value K of slave1. As shown in FIG. 7A, a position of a dotted line indicating the reference time is superimposed with a position of a start time of a certain connection event of slave1. It is supposed that a value of the target count value K is set to be 148, i.e., n=148 in FIG. 7A. Then a start time of the $148^{th}$ connection event is the reference time. It is also directly obtained that the offset time of slave1 is 0. Here, it is only necessary to compute the target count value of the connection event and an offset time offset2 of slave2.

In an example, the target count value of the connection event and the offset time of slave2 may be computed in the manner described in operation 102 as shown in FIG. 4. In a case where a specific value K1 of the target count value K of slave1 is set to be greater than the current count value K0 of slave1, firstly, the master device may compute the reference time t according to a value of the target count value K of slave1, the current count value K0 of slave1, the connection event period T1 of slave1 and the current time t1 of the master device. Herein, t=t1+(K1−K0)*T1. Secondly, the master device may acquire the connection establishment time t0 that is pre-stored, and compute and denote a time difference between the connection establishment time and the reference time as Δt1, and Δt1=t−t0. Thirdly, a target count value K2 of slave2 and the offset time offset2 are computed. Δt1 is divided by the connection event period T2 of slave2 to obtain a quotient K2 and a remainder offset2, i.e., Δt1/T2=K2 . . . offset2. Therefore, the target count value K2 and the offset time offset2 of the connection event of slave2 are obtained.

In another example, the target count value of the connection event and the offset time of slave2 may be computed in the manner described in operation 102 as shown in FIG. 5. In a case where the specific value K1 of the target count value K of slave1 is set to be greater than the current count value K0 of slave1, firstly, the master device may compute the time difference Δt2 between the reference time t and the current time t1 of the master device, and Δt2=(K1−K0)*T1. Herein, T1 is the connection event period of slave1. Secondly, the target count value K2 and the offset time offset2 of slave2 are computed. Δt2 is divided by the connection event period T2 of slave2 to obtain a quotient Δk and a remainder offset2. The target count value K2 of slave2 is equal to a sum of a current count value K02 and the quotient Δk of slave2. Herein, computing formulas include Δt2/T2=Δk . . . offset2 and K2=K02+Δk. Therefore, the target count value K2 and the offset time offset2 of slave2 may be obtained.

Figure 7B:
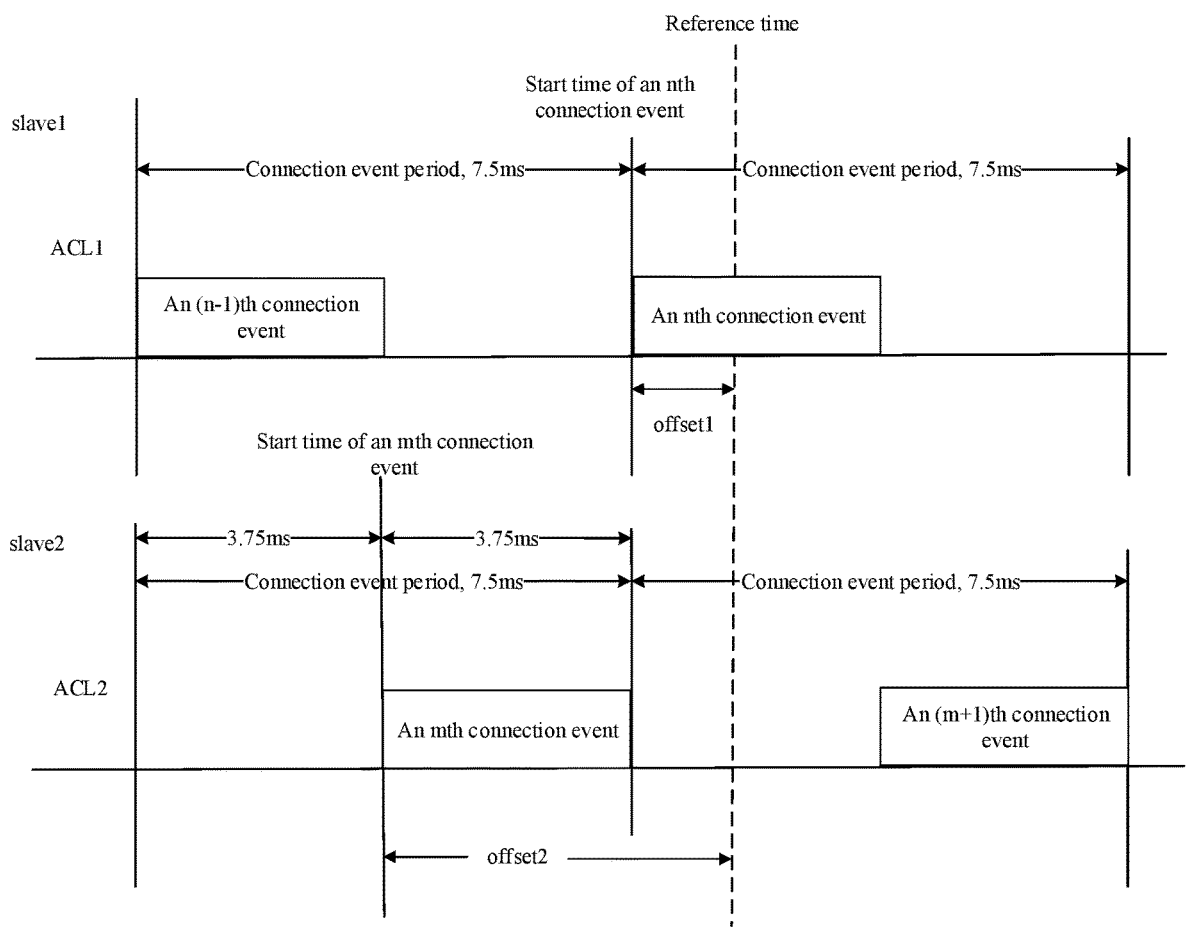

As shown in FIG. 7B, for slave1 and slave2 in FIG. 7A, master randomly sets one time point as a reference time. Here, it is necessary to compute the target count value of the connection event of slave1, i.e., a value of n in FIG. 7A, and an offset time offset1 of slave1. It is also necessary to compute the target count value of slave2, i.e., a value of m in FIG. 7A, and an offset time offset2. A specific computing method is described in operation 102 in FIG. 4 or FIG. 5 and is not repeated here.

Figure 8:
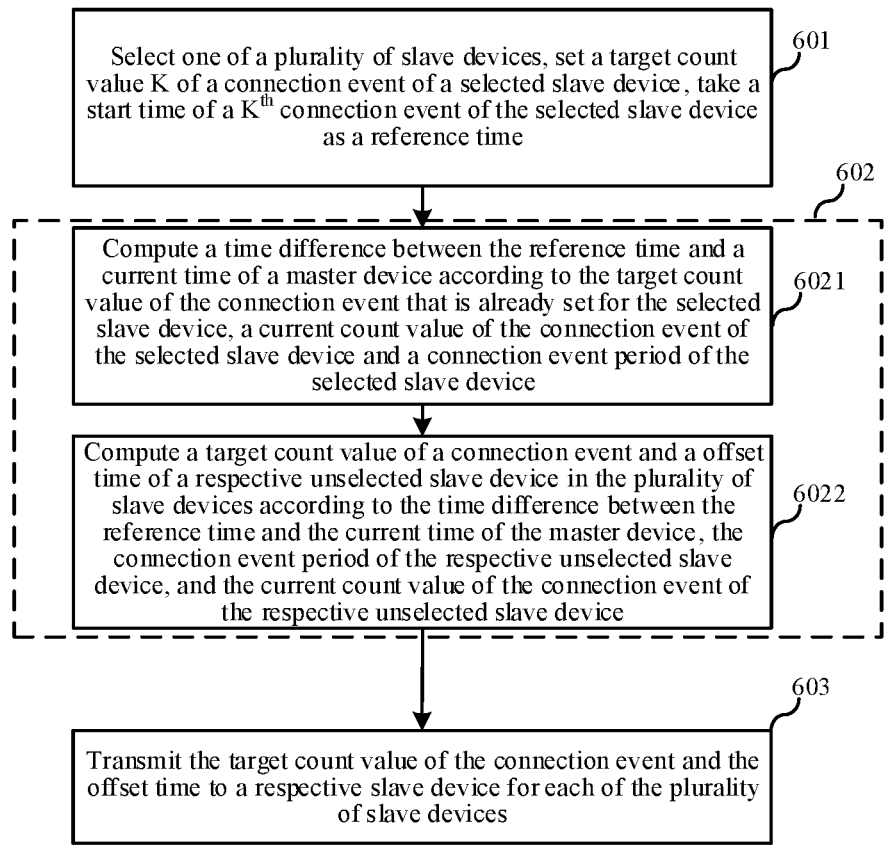
FIG. 8 is a flow chart showing that a master device computes a target count value K and an offset time according to still another embodiment of the present disclosure.

In an embodiment, as shown in FIG. 8, on the basis of FIG. 6, operation 602 may include the following operations.

In 6021, a time difference between a reference time and a current time of the master device is computed according to a target count value of a connection event that is already set of a selected slave device, a current count value of the connection event of the selected slave device and a connection event period of the selected slave device.

Specifically, a count difference between a set target count value k1 and the current count value k0 of the selected slave device is denoted as Δk. In a case where the set target count value k1 is greater than the current count value k0, Δk=k1−k0. The time difference between the reference time and the current time of the master device is Δt2=(k1−k0)*T1. Herein, T1 denotes the connection event period of the selected slave device. Herein, operations 6021 and 6023 are both to compute the time difference between the reference time and the current time of the master device, and are only different in terms of computing manner.

In 6022, a target count value of a connection event and an offset time of each unselected slave device is computed according to the time difference between the reference time and the current time of the master device, a connection event period of a respective unselected slave device, and a current count value of a connection event of the respective unselected slave device.

Herein, operation 6022 differs from operation 1024 in that: the target count value and the offset time of each slave device have to be computed in operation 1024, while it is not necessary to compute the target count value and the offset time of the selected slave device in operation 6022. Computing of target count values and offset times of slave devices is the same in operation 6022 as in operation 1024 and is not repeated here.

For example, connection is established respectively between the master device (e.g. master) and three slave devices (e.g. slave1, slave2 and slave3). A connection event period of slave1 is 1 s. A connection event period of slave2 is 2 s. A connection event period of slave3 is 3 s. A current count value of slave1 is 13, a current count value of slave2 is 23, and a current count value of slave3 is 56.

In a supposed case one, master selects slave1, i.e., slave1 is the selected slave device. Master sets the target count value K of the connection event of slave1 as 116, and it may be directly determined that offset of slave1 is 0. Here, the time difference between the reference time and the current time of the master device is $\Delta t2=(116-13)*1$ s=103 s. According to $\Delta t2/T=\Delta k$ . . . offset and the target count value $K=K0+\Delta k$, for slave2, 103 s/2 s=51 . . . 1, the target count value K=23+51=74, and offset is 1 s. For slave3, 103 s/3 s=34 . . . 1, the target count value K=56+34=90, and offset is 1 s.

In a supposed case two, master selects slave2, i.e., slave2 is the selected slave device. Master sets the target count value K of the connection event of slave2 as 100, and it may be directly determined that offset of slave2 is 0. Here, the time difference between the reference time and the current time of the master device is $\Delta t2=(100-23)*2$ s=154 s. According to $\Delta t2/T=\Delta k$ . . . offset and the target count value $K=K0+\Delta k$, for slave1, 154 s/1 s=154, the target count value K=13+154=167, and offset is 0. For slave3, 154 s/3 s=51 . . . 1, the target count value K=56+34=107, and offset is 1 s.

In the embodiment, not only does the master device not have to compute the target count value and the offset time of the selected slave device, thereby data computing is reduced, but the master device does not have to compute a specific reference time in a process of computing the target count value and the offset time of the unselected slave device, so that computing is easier and faster.

In operation 103, after the master device computes the target count value of the connection event and the offset time of each slave device, there may be wait until a next connection event of a respective slave device comes, and the target count value and the offset time may be transmitted in the next connection event to the respective slave device. Alternatively, the master device may transmit the target count value and the offset time to a respective slave device in any connection event. Herein, the master device may encapsulate the target count value and the offset time in a control signal and transmit the control signal to the respective slave device.

Further, after the target count value and the offset time are computed, the target count value and the offset time are transmitted to the slave device in the next connection event. Therefore, when the master device sets a future time point as the reference time, a time period of at least one connection event period may be reserved. That is, the time difference between the reference time and the current time is greater than or equal to one connection event period. Therefore, it is ensured as much as possible that the reference time is not arrived yet when the slave device receives the target count value and the offset time. The slave device may perform control directly based on a received target count value and offset time, and perform a task at the reference time.

Synchronization of data sampled by the plurality of slave devices is not only related to whether sampling start times are synchronous, but also related to whether local sampling clocks of slave devices are synchronous. Since data sampling by each slave device is a completely independent process and is controlled by the respective local sampling clock, inconsistent local sampling clocks would result in asynchronization of data sampling. Therefore, each slave device may further perform calibration on the respective local sampling clock. The calibration may be performed during performing of tasks or right after the connection is established. That is, the synchronization control method implemented by each slave device further includes the operation of calibration on the respective local sampling clock.

Figure 9:
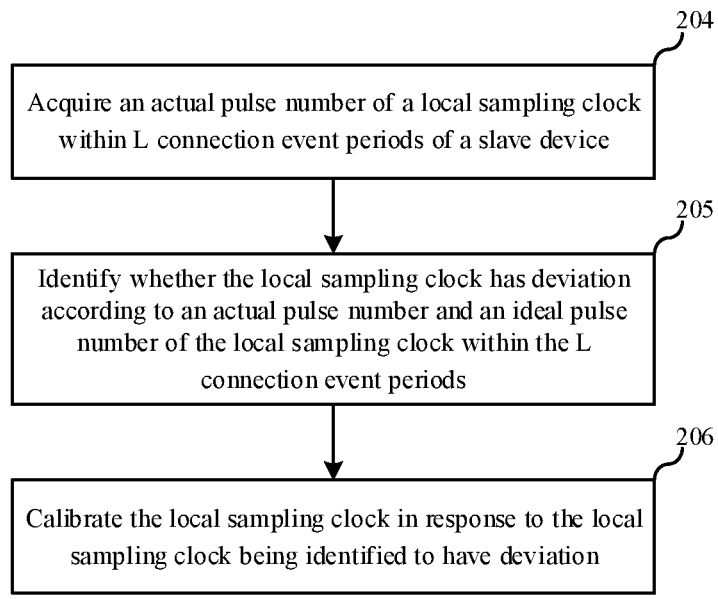
FIG. 9 is a flow chart showing that a slave device calibrates a local sampling clock according to an embodiment of the present disclosure.

In an embodiment, as shown in FIG. 9, calibration by a slave device on a local sampling clock includes the following operations.

In 204, an actual pulse number of a local sampling clock within L connection event periods of the slave device is acquired. Herein, L is an integer greater than or equal to 1.

In 205, whether the local sampling clock has deviation is identified according to the actual pulse number and an ideal pulse number of the local sampling clock within the L connection event periods. Herein, the ideal pulse number is determined by a sampling frequency of the local sampling clock, the connection event period and a value of L.

In 206, the local sampling clock is calibrated when the local sampling clock is identified to have deviation.

In communication between each slave device and the master device based on the BLE ACL link, a BLE clock of each slave device is aligned with a BLE clock of the master device. Therefore, the BLE clock of the master device may be used as a reference source to correct a local sampling clock of each slave device. Specifically, the BLE clock controls the connection event periods. Therefore, it may be compared whether an actual pulse number matches an ideal pulse number of the local sampling clock within L connection event periods. Not matching indicates that there is deviation to the local sampling clock. Herein, the actual pulse number not matching the ideal pulse number may be understood as that the actual pulse number is different from the ideal pulse number, or a difference between the actual pulse number and the ideal pulse number is beyond a preset error range. The actual pulse number of the local sampling clock within L connection event periods may be counted during sampling. The ideal pulse number of the local sampling clock within L connection event periods may be determined by multiplication of a sampling frequency of the local sampling clock, the connection event period and L. Herein, the connection event period is referred to by second. L may be provided with a value as desired. For example, L may be 1. For example, the sampling frequency of the local sampling clock is 48 KHz. Herein, the sampling frequency may be understood as an ideal sampling frequency of the local sampling clock. If the connection event period are 1s, the ideal pulse number of the local sampling clock within one connection event period is 48. If the connection event period are 2 s, then the ideal pulse number of the local sampling clock within one connection event period is 96.

When there is deviation in the local sampling clock, the slave device calibrates the local sampling clock. Specifically, the calibration may be performed by adjusting a clock factor of the local sampling clock (the clock factor may control a clock speed), so that the local sampling clock is aligned with the BLE clock of the master device. Herein, a mature algorithm like the proportion integral differential (PID) algorithm or the fuzzy control algorithm may be introduced into a method of adjusting the clock factor, which is not described in detail here.

In this embodiment, local sampling clock of each slave device is aligned with the BLE clock of the master device, so that the local sampling clock of the plurality of slave devices are consistent. Therefore, the plurality of slave devices may not only make sampling start times consistent, but because sampling frequencies of the local sampling clocks are consistent, the processes of data sampling are consistent. That is, inconsistency of sampling time periods corresponding to the $i^{th}$ frame of data sampled by the plurality of slave devices because of inconsistency of local sampling clocks of the plurality of slave devices is avoided as much as possible. Therefore, the technical solution in this embodiment can significantly ensure synchronization of an entire data collection process of each slave device.

For a piconet formed by the master device and the plurality of slave devices, data is required to be not only synchronous but also timely. Higher synchronization of the plurality of slave devices in performing tasks may reduce extra processing cost taken by the master device to improve synchronization. Further, timeliness of data transmission in the piconet may further be improved. In addition, timeliness of data transmission is also related to a time difference in the master device receiving data frames of the same sequence number transmitted by the plurality of slave devices. In a case where synchronizations of the plurality of slave devices performing tasks are the same, a shorter time difference in receiving data frames with the same number transmitted from the plurality of slave devices to the master device and a shorter time for waiting required in data processing by the master device, the more timely data synchronization. The following embodiments may improve timeliness of data synchronization.

Figure 10:
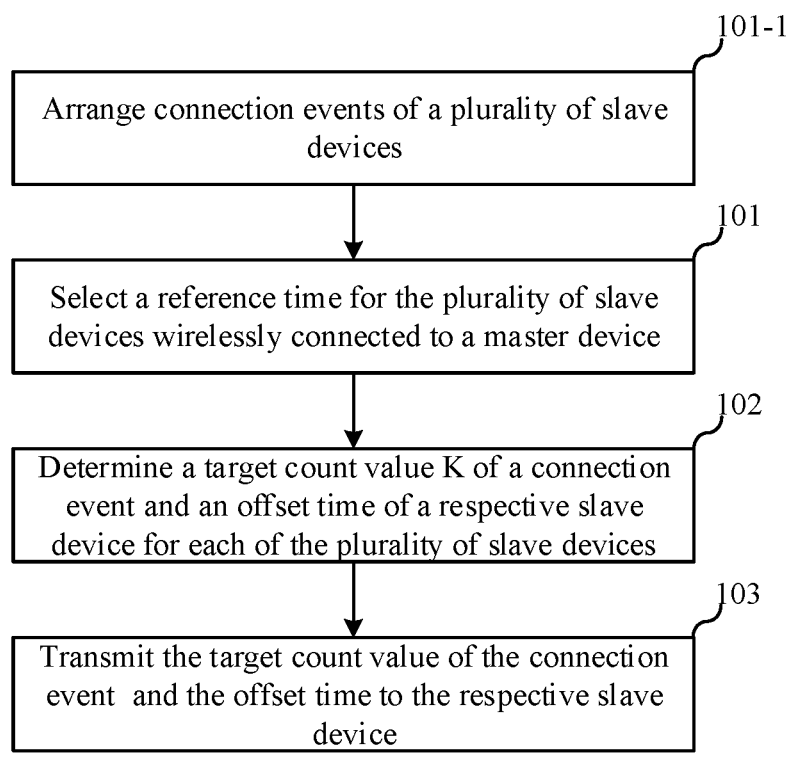
FIG. 10 is a flow chart showing that a master device arranges connection events of slave devices according to an embodiment of the present disclosure.

In an embodiment, as shown in FIG. 10, a synchronization control method implemented by a master device includes an operation 101-1 of arranging connection events of the plurality of slave devices according to a preset requirement. The preset requirement includes: connection event periods of the plurality of slave devices are equal, and the connection events of the plurality of slave devices occur at different times within each of the connection event periods. Herein, performing order of operations 101-1 and 101 is not limited, as long as these operations are performed before operation 102 and after connection between the master device and the plurality of slave devices are respectively established.

Herein, within each connection event period, the connection events of the plurality of slave devices occurring at different times within one connection event period may be understood as: in each connection event period, the connection events of the plurality of slave devices respectively occur once; and within the connection event period, of two successive connection events, a start time of a later connection event is later than or equal to an end time of a former connection event, and an end time of the last connection event is earlier than or equal to an end time of the connection event period. Alternatively, within each connection event period, the connection events of the plurality of slave devices occurring at different times within one connection event period may be understood as: within each connection event period, the connection events of the plurality of slave devices do not conflict. Within each connection event period, all connection events of the plurality of slave devices would occur once. Therefore, for each slave device, a time difference between a time point at which the slave device transmits the data frame and a time point at which the master device receives the data frame is not greater than one connection event period. That is, when the slave device transmits a data frame to the master device, a time delay caused by a data frame transmission process generally is not greater than one connection event period.

In a scenario where each slave device samples data frames in real time and transmits the data frames to the master device, each slave device generally continuously collects data within one connection event period to obtain a data frame. The data frame is transmitted to the master device in a next connection event (i.e. a connection event that occurs within a next connection event period) after the data frame is collected. That is, during a whole process that the slave device samples data frames in real time and transmits the data frames to the master device, a length of time spent in data frame collection is generally one connection event period, and the length of time spent on data frame transmission generally does not exceed one connection event period. Therefore, a time delay of an entire data synchronization process would not exceed a time length of two connection event periods. In another scenario, if the data frames are pre-stored in a memory of the slave device, the slave device does not collect the data frames in real time, but acquires the data frames from the memory and transmits them to the master device. A time for acquiring the data frames from the memory is extremely short, compared with one connection event period, and may be ignored. As a result, the time delay of the entire data synchronization process generally does not exceed a time length of one connection event period.

Further, the preset requirement may include: in each connection event period, an interval between two successive connection events is equal to or less than a preset time length. Herein, the interval refers to: between two successive connection events within each connection event period, a time difference between a start time of a later connection event and an end time of a former connection event. The preset time length may be equal to or slightly greater than a time required for the master device to switch links. A compact arrangement as such can reduce time length of waiting for the master device to receive all data frames transmitted from the plurality of slave devices as much as possible, so as to improve timeliness during synchronization to a maximum extent.

Figure 11A:
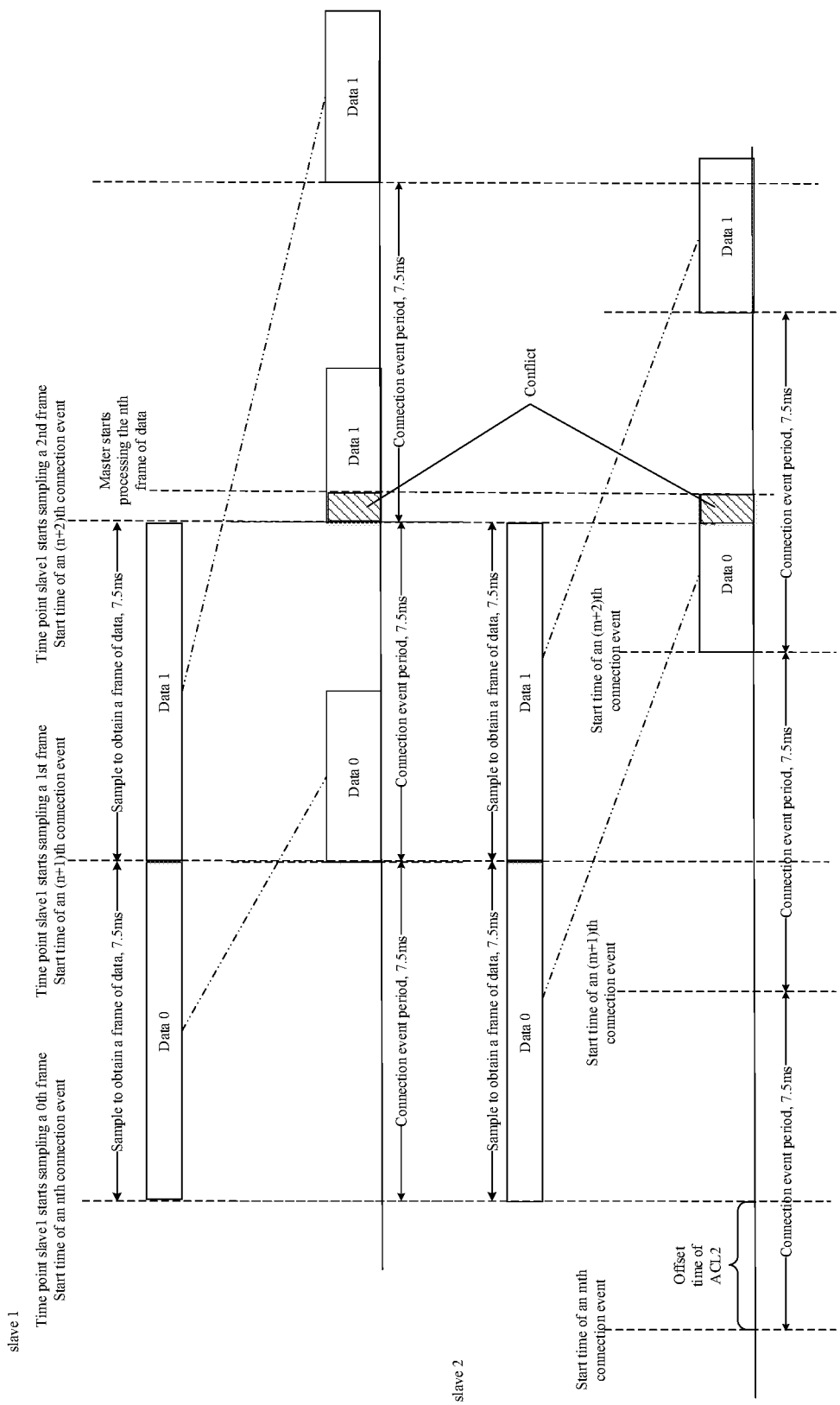
FIG. 11A and FIG. 11B are schematic diagrams showing connection events of slave devices before and after the connection events are arranged.
Figure 11B:
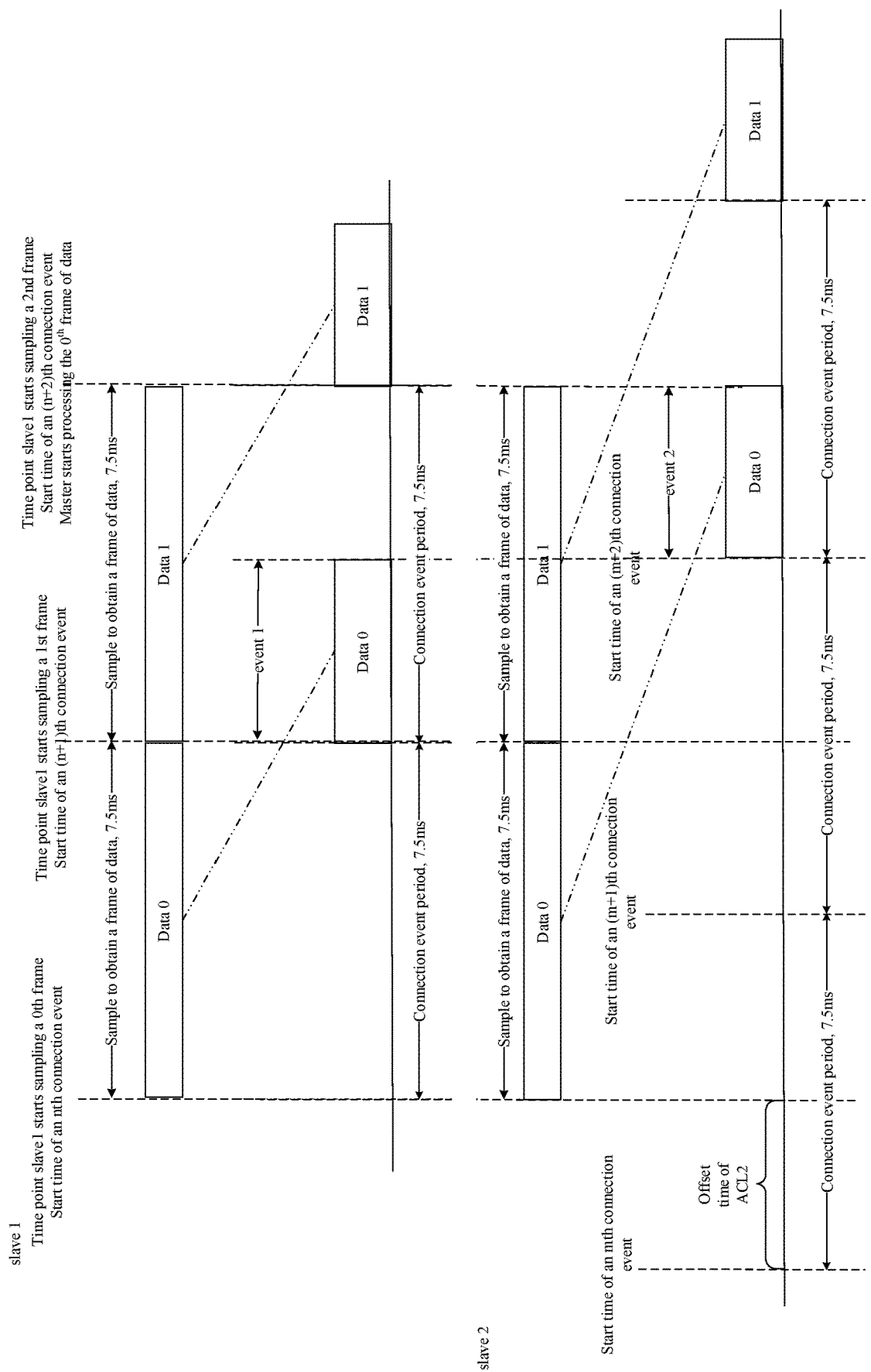

For example, FIG. 11A and FIG. 11B are schematic diagrams showing connection events of two slave devices before and after the connection events are arranged. A link between the slave device (e.g. slave1) and the master device (e.g. master) is denoted as ACL1, and a link between the slave device (e.g. slave2) and the master device (e.g. master) is denoted as ACL2. Connection event periods T of slave1 and slave2 are the same, i.e., 7.5 ms. Durations of the connection events of ACL1 and ACL2 are also the same, i.e., 3.75 ms. It shall be noted that in the example, a sum of the durations of the connections events of slave1 and slave2 is equal to the connection event period. Therefore, in one connection event period, an interval between arranged connection events of slave1 and slave2 is equal to zero. That is, a start time of a later connection event is equal to an end time of a former connection event. As shown in FIG. 11B, in one connection event period, a connection event event1 of slave1 and a connection event event2 of slave 2 occur successively, and a start time of event2 is equal to an end time of event1. However, in another example, if a sum of durations of the connection events of the plurality of slave devices is less than the connection event period, the interval between the arranged connection events of the plurality of slave devices may not be zero.

As shown in FIG. 11A, before the arrangement, in one connection event period, the connection events of slave1 and slave2 would conflict. That is, in one connection period, Data1 to be transmitted by slave1 would conflict against Data0 being transmitted by slave2. A shadow in the FIG. 11A indicates a conflict part. In order to avoid the conflict, slave1 cannot transmit Data1 in this period, but has to wait to transmit Data1 in a next connection event period. Similarly, in the next connection event period, Data1 to be transmitted by slave2 will conflict against Data1 being transmitted by slave2. To avoid this conflict, slave2 cannot send Data1 in the next period, but waits to transmit Data1 in the next connection event period. That is, in one connection event period, the connection events of each slave device respectively occur completely once. Therefore, it takes two connection event periods for Data0 of slave1 and slave2 to be transmitted and received by the master device, and it takes two connection event periods for Data1 of slave1 and slave2 to be transmitted and received by the master device. That is, slave1 and slave2 transmit data frames with the same numbers, and it takes two connection event periods from transmission to being received completely by the master device. Besides, it takes one connection event period to collect one frame of data. Therefore, for each frame of data, it takes three connection event periods from collection to being received by the master device. That is, for audio data, from being collected to being played by the master device, about three connection event periods are delayed.

As shown in FIG. 11B, after the arrangement, the connection events of slave1 and slave2 are arranged within different time periods of one connection event period. Therefore, within each connection event period, the connection events of slave1 and slave2 do not conflict. That is, in one connection event period, each slave device may separately complete one connection event. The master device may receive Data0 transmitted by slave1 and slave2 within one connection event, and receive Data1, . . . transmitted by slave1 and slave2 within one connection event. It takes one connection event period for Data0 of slave1 and slave2 to be transmitted and completely received by the master device. It takes one connection event period for Data1 of slave1 and slave2 to be transmitted and completely received by the master device. That is, slave1 and slave2 transmit data frames with the same number, and it takes one connection event period for the data frames to be transmitted and completely received by the master device. It also takes one connection event period to collect one frame of data. Therefore, it takes two connection event periods for each frame of data to be collected and received by the master device. That is, the audio data may be delayed by two connection event periods from being collected to being played by the master device.

Accordingly, a reasonable arrangement on the connection events of the plurality of slave devices may avoid the following problems: two link conflicting lengthens a transmission period of one data frame, resulting in a lengthened time of the master device receiving synchronization data transmitted by the plurality of slave devices, i.e., resulting in synchronization waiting time being increased and data synchronization not being timely.

Figure 12A:
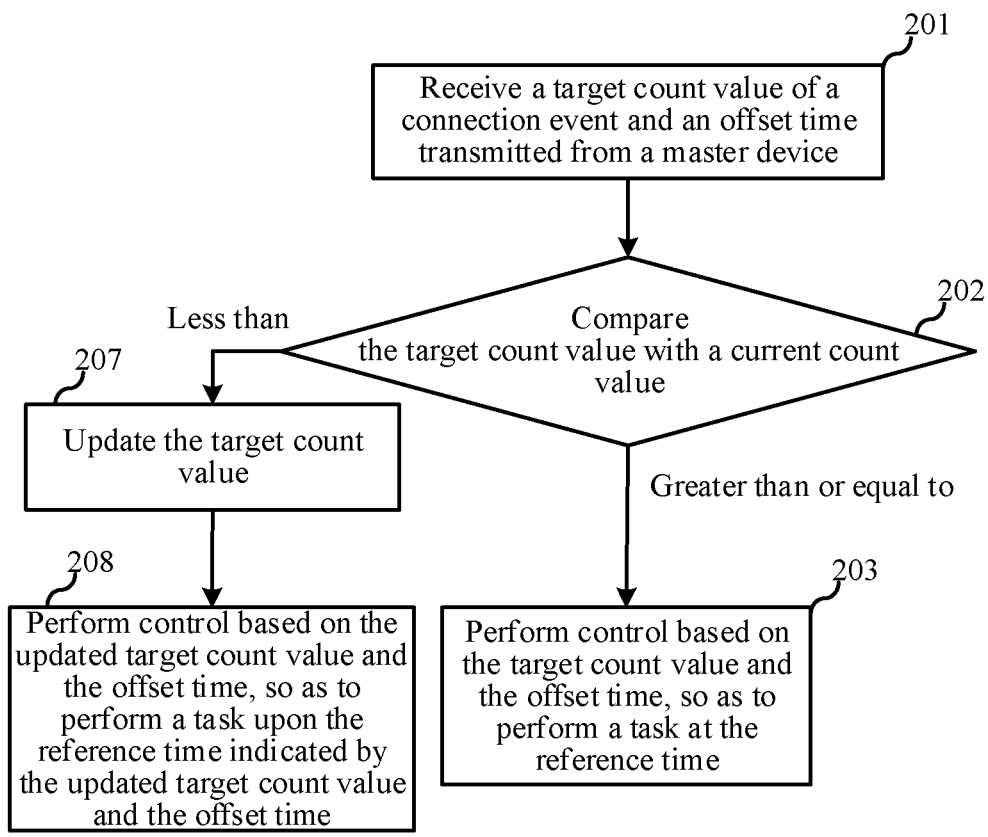
FIG. 12A and FIG. 12B are flow charts showing two ways that a slave device regains a target count value K and an offset time after it is found through checking that a reference time is overdue.

In an embodiment, as shown in FIG. 12A, a slave device performs operation 202, which specifically is to compare a target count value of a connection event with a current count value of the connection event. If the target count value is greater than or equal to the current count value, this indicates that the target count value received and the reference time indicated by an offset time are not overdue, and operation 203 is directly performed. Specifically, the slave device monitors the current count value in real time, and starts to perform a preset task when the current count value achieves the target count value and after delaying by the offset time.

Further, if the target count value is less than the current count value, this indicates that the target count value received and the reference time indicated by the offset time are overdue. The slave device can not perform control based on the target count value received and the offset time. The slave device may initiatively acquire a target count value and an offset time that may indicate a future reference time, so as to continue to perform synchronization control. There are two manners as follows.

In Manner One, as shown in FIG. 12A, in a case where a target count value is less than a current count value, operations 207 and 208 are performed.

In 207, the target count value is updated according to the current count value to obtain an updated target count value. Herein, the updated target count value and the reference time indicated by the offset time are not overdue.

In 208, control is performed based on the updated target count value and the offset time, so as to perform the task upon the updated target count value and the reference time indicated by the offset time.

Specifically, the slave device computes a difference between the current count value and the target count value before the update, and takes a sum of the current count value and the difference as the updated target count value. Alternatively, after computing the difference between the current count value and the target count value before the update, the slave device takes a sum of the current count value, the difference and a preset value as the updated target count value. Herein, the preset value is the same in each slave device, may be factory-set, or may be set by the master device and transmitted to each slave device after the connection is established.

Generally, if the reference time is overdue, each slave device would find an overdue of the reference time through detection. Each slave device would perform operations 207 and 208 upon finding out that the reference time is overdue.

Figure 12B:
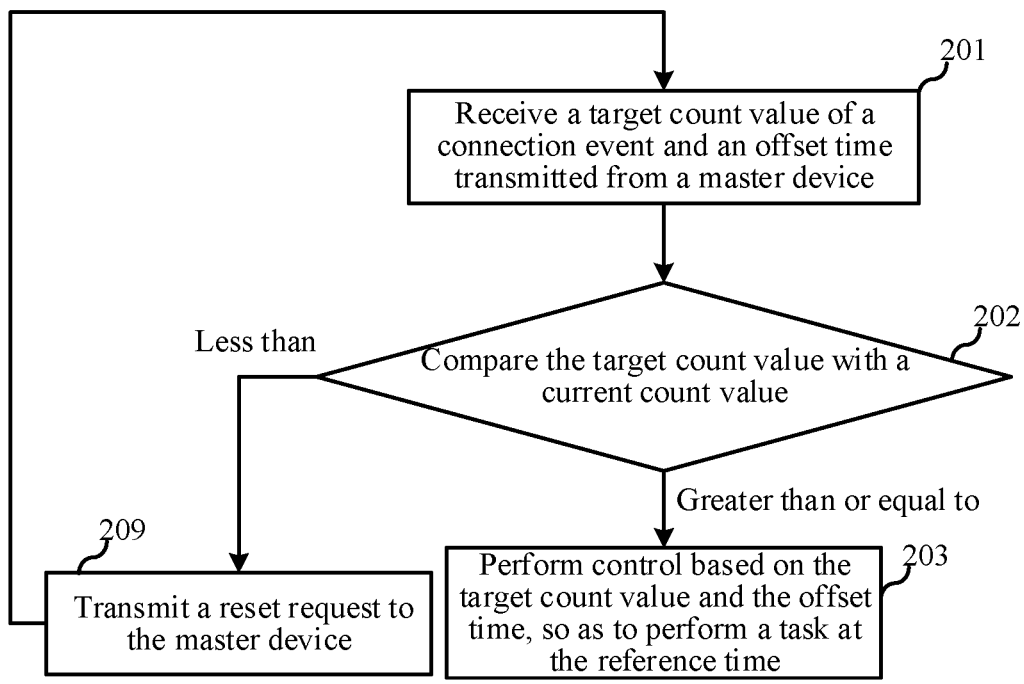

In Manner Two, as shown in FIG. 12B, in a case where a target count value is less than a current count value, operation 209 is performed to transmit a reset request to the master device. Herein, after transmitting the reset request to the master device, the slave device waits to re-receive the target count value and the offset time transmitted by the master device, i.e., to return to operations 201 and 202. When the reference time is determined not to be overdue in 202, 203 is performed. Otherwise, 209 is re-performed. Herein, the slave device may preset a greatest wait length and then transmit the reset request. If the target count value and the offset time re-transmitted by the master device are not received after the greatest wait length, another reset request would be transmitted to the master device.

Figure 13:
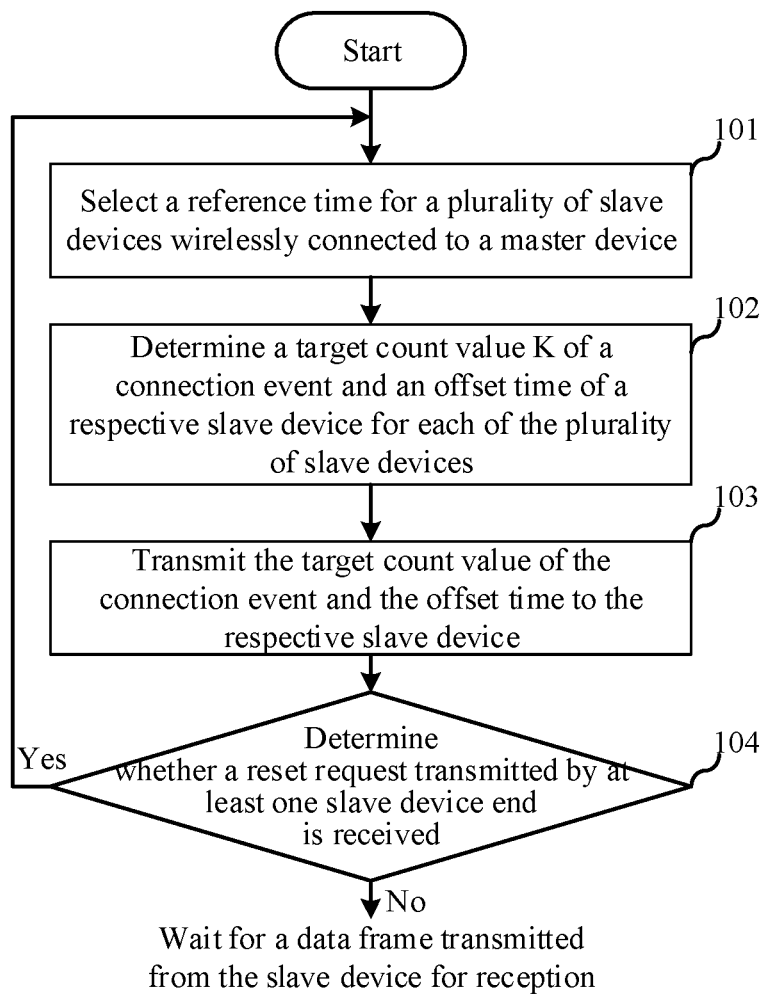
FIG. 13 is a flow chart showing a processing method of a master device corresponding to the processing manner of the slave device in FIG. 12B.

As shown in FIG. 13, corresponding to a reset request transmitted by the slave device, a method implemented by the master device includes an operation 104: determining whether the reset request transmitted by at least one slave device is received. If yes, the operations 101 to 103 are re-performed, to select a reference time for the plurality of slave devices. For each of the plurality of slave devices, the target count value K of the connection event and the offset time of the plurality of slave devices are re-determined, and the target count value and the offset time of a corresponding connection event are respectively transmitted to the plurality of slave devices. Herein, re-determining the target count value K and the offset time indicates a re-set reference time. If a determination result of 104 is no, the data frames transmitted from the plurality of slave devices are waited for. It is thus known that a condition to trigger the master device to perform operations 101-103 is: connection is established between the master device and the plurality of slave devices; or a reset request transmitted from at least one of the plurality of slave devices is received after the operation of respectively transmitting the target count value of the corresponding connection event and the offset time to the plurality of slave devices.

The above Manner One and Manner Two are two parallel implementation manners. In Manner One, when the reference time is overdue, each slave device may perform the reset task by itself. This may reduce burden on the master device and obtain a reset target count value and offset time more quickly, as compared with having to requesting the master device for reset in Manner Two. In Manner Two, the master device uniformly performs reset for the plurality of slave devices. This results in higher accuracy of synchronization control, as compared with each slave device updating the update count value and the offset time by itself in Manner One. In addition, this does require much on processing performance of each slave device connected to the master device.

Generally, if the reference time is overdue, each slave device would find it, and each slave device would respectively transmit a reset request to the master device. The master device may receive the reset request transmitted by each slave device at different times. After receiving the reset request transmitted by any slave device, the master device would start to perform reset. In addition, even if a certain slave device does not find that the reference time is overdue, the slave device would still re-receive the target count value and the offset time transmitted by the master device if the master device resets the reference time and re-computes the target count value and the offset time for each slave device because the other slave devices transmit the reset request to the master device. Here, the slave device would perform control based on a re-received target count value and offset time.

In another manner, a case may be as follows. The slave device finds that the reference time is overdue, and the slave device transmits a reset request to the master device. When the master device receives the reset request transmitted by any slave device, the master device transmits a reset request to each slave device. When each slave device receives a reset notification transmitted by the master device, the target count value and offset time are reset according to a preset reset manner, and control is performed based on the reset target count value and offset time. The reset manner may be the same as operation 207 as shown in FIG. 12A.

Because wireless transmission per se is unreliable, especially when there is interference or a farther distance, it is necessary to consider handling of packet loss. In a related art, a retransmission mechanism is set in communication between the master and slave devices. That is, after a data frame is transmitted out of the slave device, the data frame would be cached locally first. When a notification of successful reception this time fed back by the master device is received, the data packet is discarded and a next data packet is transmitted in a next connection event. When a notification of failed reception this time fed back by the master device is received, the data frame would be re-transmitted in the next connection event until the notification of successful reception this time fed back by the master device is received. Then the data frame is discarded and the next data frame is transmitted in the next connection event. This retransmission mechanism can ensure that the master device can receive the data packet transmitted by the slave device, but has an impact on synchronous transmission of data by a plurality of slave devices.

In response to this problem, two solutions are provided in the present disclosure.

Figure 14:
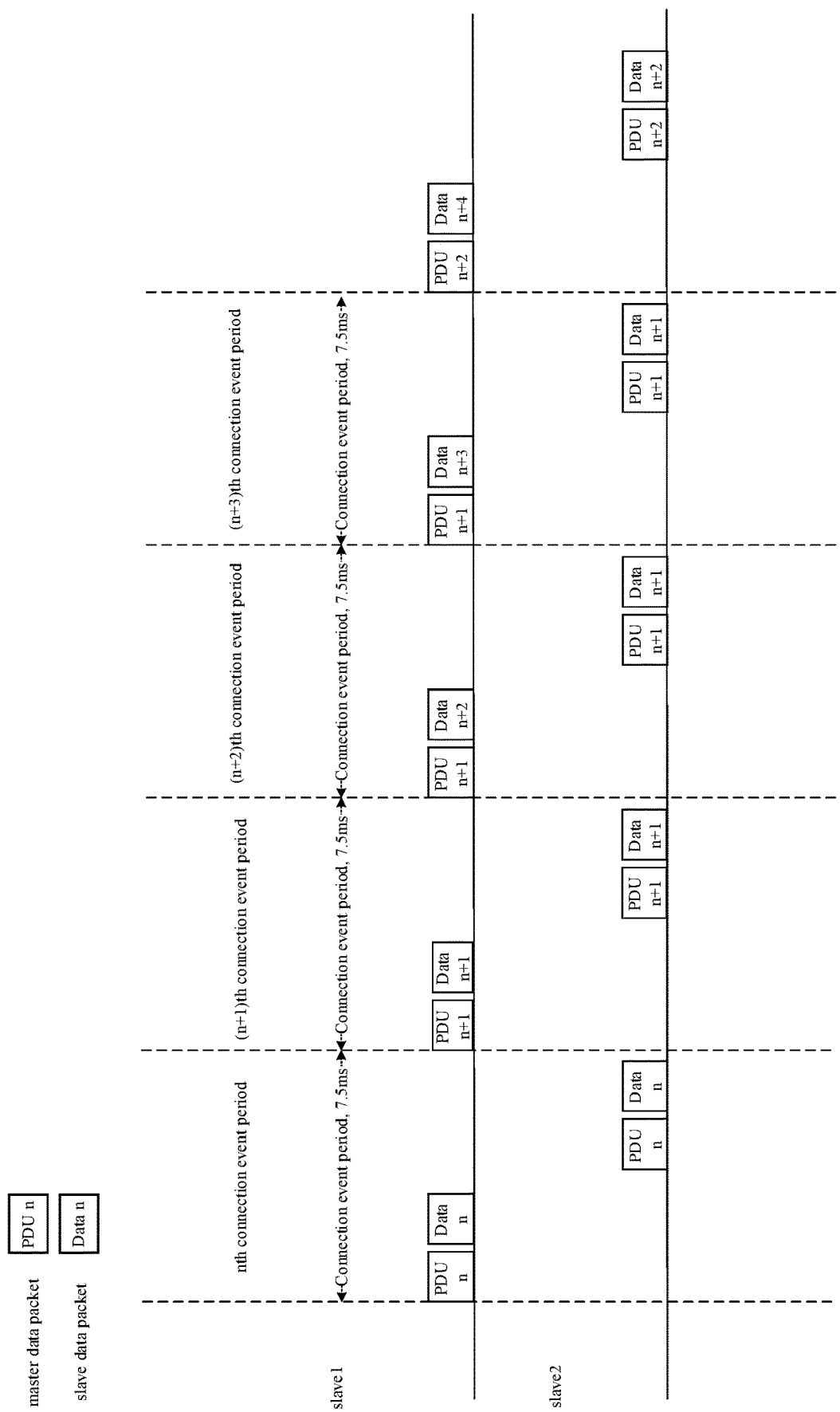
FIG. 14 is a schematic diagram showing comparison between a slave device transmitting a data frame in an embodiment of the present disclosure and a slave device transmitting a data frame in an existing technology.
Figure 15:
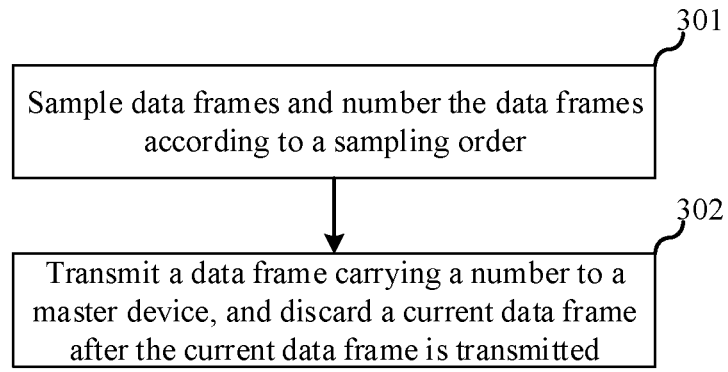
FIG. 15 is a flow chart showing that a respective slave device keeps data frame transmission synchronous during performing of a task according to an embodiment of the present disclosure.

A first solution is implemented by a slave device. In a synchronization control method implemented by the slave device, while the slave device is performing a task, a current data frame is discarded when the current data frame is transmitted. FIG. 14 is a schematic diagram of a process that a slave device using the first solution and a slave device in the existing technology perform tasks. FIG. 15 is a flow chart showing operations that a slave device using the first solution performs a task.

In 301, data frames are sampled and numbered according to a sampling order.

In 302, a data frame carrying a number is transmitted to the master device, and a current data frame is discarded after the current data frame is transmitted.

Specifically, the slave device numbers sampled data frames according to the sampling order. Here, numbers may be encapsulated into frame headers of the data frames. The slave device obtains one data frame through sampling within one connection event period, and transmits the data frame carrying a number in a next connection event period. In the next connection event period, the data frame carrying the number is the current data frame. After transmitting the current data frame, the slave device directly discards the current data frame. Each time the slave device transmits one data frame, the slave device directly discards the data frame rather than discarding the data frame after waiting until the notification of successful reception this time fed back by the master device is received. That is, it may be considered that even if the master device transmits the notification of failed reception this time to the slave device, the slave device does not have any response to the notification of failed reception this time. The data frame would be discarded, whether the master device feeds back the notification of successful reception or the notification of failed reception this time.

For example, as shown in FIG. 14, slave1 denotes a slave device using the first solution, slave2 denotes a slave device operating based on the retransmission mechanism in the related art. Starting from the reference time, the slave device numbers the data frames and transmits numbered data frames to the master device. Numbers may be carried in the frame headers of the data frames. Herein, in one connection event, there is an interaction between master and slave. PDU n denotes data transmitted to slave by master during the interaction. Data n denotes data transmitted to master by slave during the interaction. Slave 1 and slave 2 synchronously start numbering the data frames and transmit the data frames to the master device. A specific process is as follows.

In an $n^{th}$ connection event period, slave1 and slave2 respectively receive PDU n sent by the master device, indicating that the master device is waiting to receive an $n^{th}$ frame of data. Therefore, slave1 transmits an $n^{th}$ data (e.g. Data n) to the master device and discards Data n after the transmission. Slave2 transmits the $n^{th}$ data (e.g. Data n) to the master device and temporarily caches Data n.

In an $(n+1)^{th}$ connection event period, slave1 and slave2 respectively receive PDU n+1 transmitted by the master device, indicating that the master device has successively received Data n and waiting for the $(n+1)^{th}$ frame of data. Therefore, slave1 transmits the $n^{th}$ frame of data (e.g. Data n+1) collected in the $n^{th}$ connection event period to the master device, and discards Data n+1 after the transmission. Here, there is no data frame in a cache of slave1. Slave2 transmits Data n+1 just collected in the $n^{th}$ connection event period to the master device, and discards Data n. Here, a cache of slave2 includes Data n+1.

In an $(n+2)^{th}$ connection event period, slave1 and slave2 respectively receive PDU n+1 transmitted by the master device, indicating that the master device does not successively receive Data n+1 but is still waiting to receive the $(n+1)^{th}$ frame of data. That is, the master device operates based on the retransmission mechanism. Slave1 and slave2 process PDU n+1 differently. Specifically, slave1 has discarded Data n+1, continues to transmit Data n+2 collected in the $(n+1)^{th}$ connection event period to the master device, and discards Data n+2 after the transmission. Here, there is no data frame in a cache of slave1. Slave2 continues to transmit Data n+1 in the cache to the master device based on PDU n+1 transmitted by the master device, and stores Data n+2 just collected in the $(n+1)^{th}$ connection event period into the cache. Here, the cache of slave2 includes Data n+1 and Data n+2.

In an $(n+3)^{th}$ connection event period, for the master device, even if Data n+2 transmitted by slave1 is successively received in the $(n+2)^{th}$ connection event period, Data n+1 transmitted by slave1 is still not received. Therefore, PDU n+1 may still be transmitted to slave1. There is no data frame in the cache of slave1, and so slave1 continues to transmit Data n+3 just collected to the master device, and discards Data n+3 after the transmission. Here, there is still no data frame in the cache of slave1. In addition, the master device still does not successfully receive Data n+1 transmitted by slave2 in the $(n+2)^{th}$ connection event period, and so PDU n+1 may still be transmitted to slave2. Slave2 continues to transmit Data n+1 in the cache to the master device based on PDU n+1 transmitted by the master device. Data n+3 just collected in the $(n+2)^{th}$ connection event period is stored into the cache. Here, the cache of slave2 includes Data n+1, Data n+2 and Data n+3.

Herein, in a following connection event period, slave1 and slave2 operate in this manner.

It is known from the example in FIG. 14 that data frames transmitted by slave1 in each connection event are all collected latest, while this is not a case for slave2. Therefore, in the first solution, each slave device connected to the master device may ensure that the data frames transmitted by each connection event are collected latest. In this way, it may be ensured that data frames uploaded to each slave device are synchronous data frames, i.e., data frames with the same number. This may avoid the following problem: the retransmission mechanism causes data frame transmission by each slave device to be asynchronous, thereby increasing a length of a synchronous wait by the master device. Therefore, data synchronization may be more timely. In addition, in the method of the embodiment, that only the slave devices are involved in performing can reduce synchronous wait time of the master device, which is simple and easy to be implemented. For the master device, there is no extra processing burden.

Figure 16A:
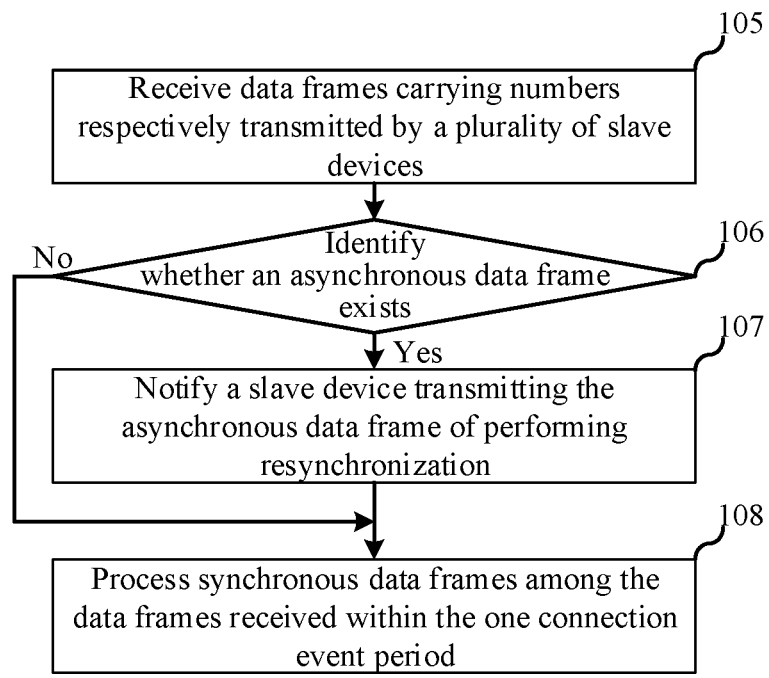
FIG. 16A and FIG. 16B are flow charts showing a respective slave device cooperate with the master device when performing tasks to synchronize data frame transmission according to an embodiment of the present disclosure.

A second solution is implemented by a master device and a slave device in cooperation to ensure synchronization of data frame transmission. FIG. 16A shows a method of performing a task by the master device, including the following operations.

In 105, data frames carrying numbers and respectively transmitted by the plurality of slave devices are received. Herein, tasks of the plurality of slave devices include: transmitting the data frames carrying numbers to the master device in an order of the numbers.

In 106, whether an asynchronous data frame exists among data frames received within one connection event period is identified according to the numbers carried in the data frames. If yes, 107 and 108 are performed. If no, 108 is directly performed.

In 107, a slave device transmitting the asynchronous data frame is notified of performing resynchronization and 108 is performed.

In 108, synchronous data frames among the data frames received within the one connection event period are processed.

Figure 16B:
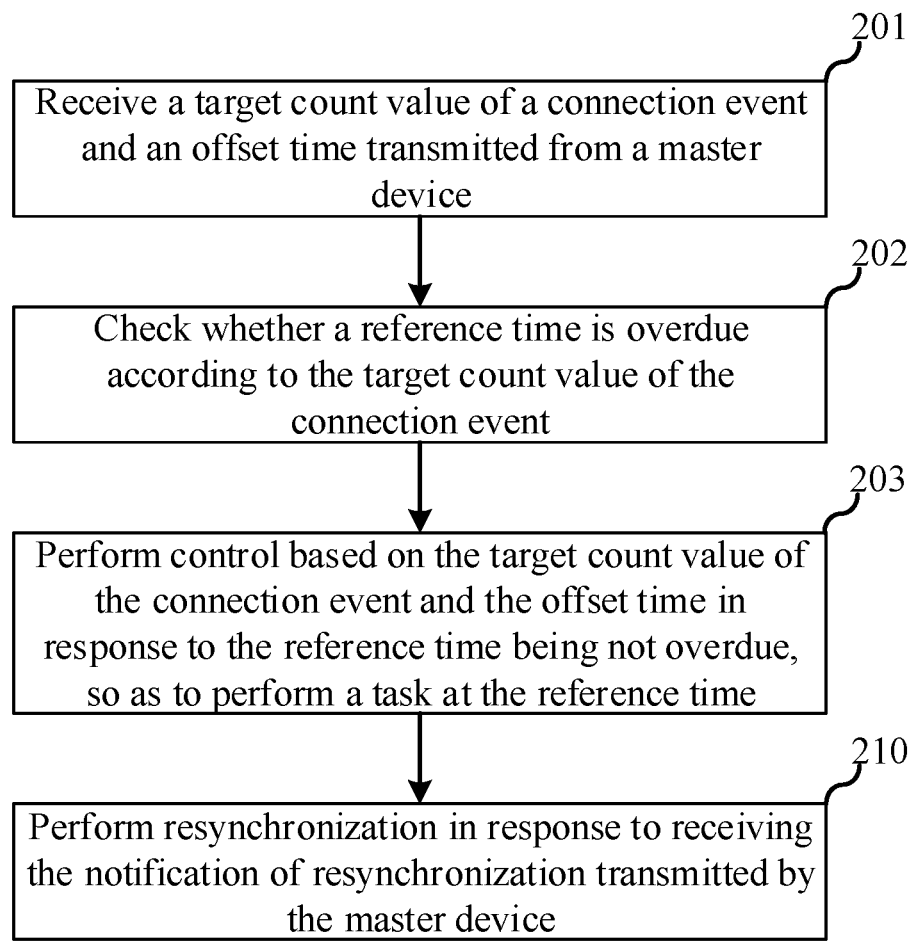

As shown in FIG. 16B, in order to correspond to a notification of resynchronization transmitted by the master device, a synchronization control method implemented by a slave device includes an operation 210 of performing resynchronization when the notification of resynchronization transmitted by the master device is received.

In the embodiment, the connection events of the plurality of slave devices are arranged according to preset requirements. Therefore, in one connection event period, the master device may receive the data frames transmitted by the plurality of slave devices. The master device identifies the plurality of data frames received within the one connection event period. If the numbers of the plurality of data frames are not completely the same, this indicates that the data frames of the plurality of slave devices are asynchronous. With reference to slave2 in FIG. 14, in a case where operation is based on a retransmission mechanism in the related art, a number of a data frame transmitted by slave2 in an $(n+2)^{th}$ connection event period is small. Asynchronization occurs, compared with other slave devices to which no retransmitted data frame occurs. That is, data frames transmitted by slave2 in the $(n+2)^{th}$ connection event period are asynchronous data frames. Therefore, based on the second solution, the master device would transmit a notification of resynchronization to slave2. The notification of resynchronization may be transmitted in a form of a control signal. Herein, during the connection event period, the master device may combine data frames received from slave devices. However, since asynchronous data frames are included, processed data frames being played may be inconsistent with a real sound. Therefore, in one example, the master device may only process synchronous data frames in the connection event period while discarding the asynchronous data frames, so as to avoid the problem that asynchronous data frames composed and played are not consistent with the real sound. In addition, there is no limitation to a performing order of operations 107 and 108.

Herein, in 106, asynchronous data frames are identified according to the numbers carried in the data frames. Specifically, when the data frames are numbered in an ascending order, in one connection event period, a data frame having a largest number is a synchronous data frame, while others are asynchronous data frames. When the data frames are numbered in a descending order, in one connection event period, a data frame having a smallest number is a synchronous data frame, while others are asynchronous data frames. However, the present disclosure is not limited to this. If the data frames are numbered according to another preset logic, the asynchronous data frames may be identified based on this preset logic. As shown in FIG. 14, the data frames have different numbers. In the $n^{th}$ connection event period, the master device respectively receives data frame Data n having a number of n uploaded by slave1 and slave 2, showing that Data n is a synchronous data frame. In an $(n+3)^{th}$ connection event period, the master device receives data frame Data n+3 having a number of n+3 uploaded by slave1, and receives data frame Data n+1 having a number of n+1 uploaded by slave2. Herein, Data n+3 having a greater number is a synchronous data frame, while Data n+1 having a smaller number is an asynchronous data frame. In addition, in the $(n+1)^{th}$ connection event period, the master device receives the data frame Data n+1 having the number of n+1 uploaded by slave1, and does not receive the data frame Data n+1 having the number of n+1 uploaded by slave2. Here, the master device deems that Data n+1 uploaded by slave1 and Data n uploaded by slave2 are received (because Data n+1 transmitted by slave2 this time is not successively received, it is still deemed that Data n is received from slave2). Therefore, in the $(n+1)^{th}$ connection event period, Data n+1 having a greater number is a synchronous data frame, while Data n having a smaller number is an asynchronous data frame. Herein, a case in the $(n+2)^{th}$ connection event period is similar to that in the $(n+1)^{th}$ connection event period and is thus not repeated.

In a scenario where a slave device collects and transmits a data frame to the master device, the slave device may perform resynchronization by discarding a data frame in the cache region. That is, a slave device that transmits an asynchronous data frame would discard all data frames cached locally. As shown in FIG. 14, when slave2 receives the notification of resynchronization within the $(n+3)^{th}$ connection event period, slave2 would discard Data n+1, Data n+2 and Data n+3 locally cached and transmit in an $(n+4)^{th}$ connection event period an $(n+4)^{th}$ frame of data Data n+4 obtained in the $(n+3)^{th}$ connection event period. That is, synchronization with other slave devices to which retransmission has never occurred may be implemented again from the $(n+4)^{th}$ connection event period.

In another scenario, the data frames are pre-stored in memories of the plurality of slave devices. Here, in 107 of FIG. 16A, the master device may obtain a number y2=y1+X+1 of synchronous data frames after X connection event periods through computing according to the number y1 in the synchronous data frames in a current connection event period. The master device may transmit a value of X and the number y2 to a slave device. The slave device performs resynchronization according to the value of X and the number y2. An implementation manner for resynchronization may be: transmitting a data frame with the number of y2 after waiting for X connection event periods. The value of X may be set by the master device.

In the embodiment, the master device and the plurality of slave devices coordinate with each other to keep data frame transmission synchronous, thereby reducing the synchronous wait time of the master device, and improving timeliness of data. Alternatively, in a case where data frame transmission is kept synchronous, the master device does not have to perform complicated processing (for example, each frame of data is separated to perform waveform comparison and the like to identify data sampled within the same time period) so as to ensure accuracy of data obtain through combination.

Both of the above two solutions may remove the problem of data asynchronization caused by the retransmission mechanism in master-slave device communications. The master device may select one solution as desired and notify the slave device of the solution. Alternatively, one solution may be set to be used upon completion of production of the master device and the plurality of slave devices.

The above embodiments may be combined and refer to each other. For example, the following are examples of combinations, to which the present disclosure is not limited. In a case where there is no conflict, the embodiments may be combined randomly into one new embodiment.

Figure 17:
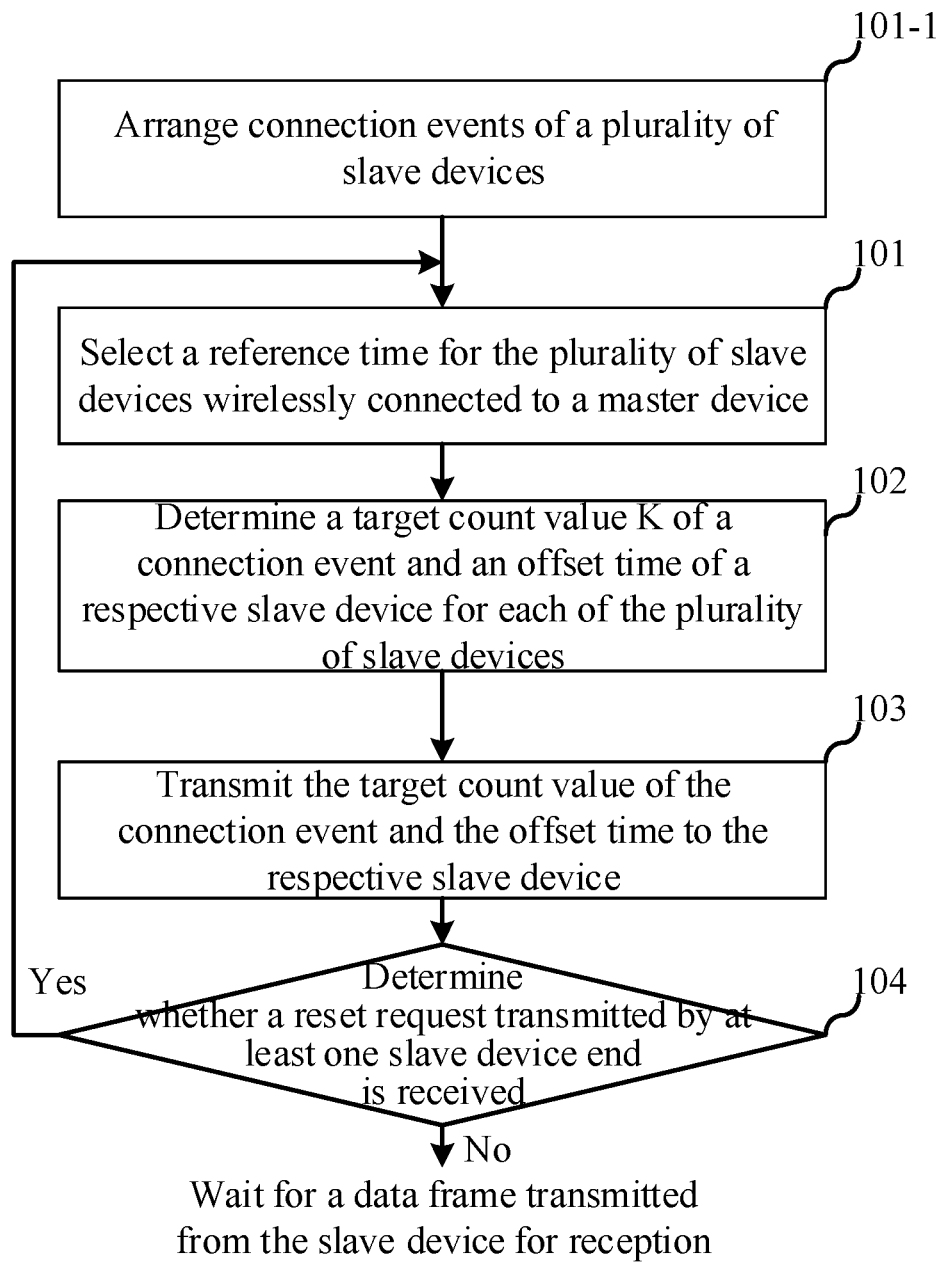
FIG. 17 is a flow chart showing a synchronization control method implemented by a master device according to another embodiment of the present disclosure.

In an embodiment, as shown in FIG. 17, a synchronization control method implemented by a master device includes the following operations.

In 101-1, connection events of a plurality of slave devices are arranged according to a preset requirement. Herein, the preset requirement includes: connection event periods of the plurality of slave devices are equal, and the connection events of the plurality of slave devices do not conflict each other within each of the connection event periods.

In 101, a reference time is set for the plurality of slave devices wirelessly connected to the master device.

In 102, for each of the plurality of slave devices, a target count value K of a connection event and an offset time of a respective slave device are determined. Herein, an offset time of a slave device refers to a time difference between the reference time and a start time of a $K^{th}$ connection event of the slave device.

In 103, the target count value of the connection event and the offset time are respectively transmitted to the plurality of slave devices.

In 104, whether a reset request transmitted by at least one slave device is received is determined. If a determination result of 104 is yes, the above operations 101-103 are performed again. If the determination result of 104 is no, data frames transmitted from the plurality of slave devices are waited for reception.

Figure 18:
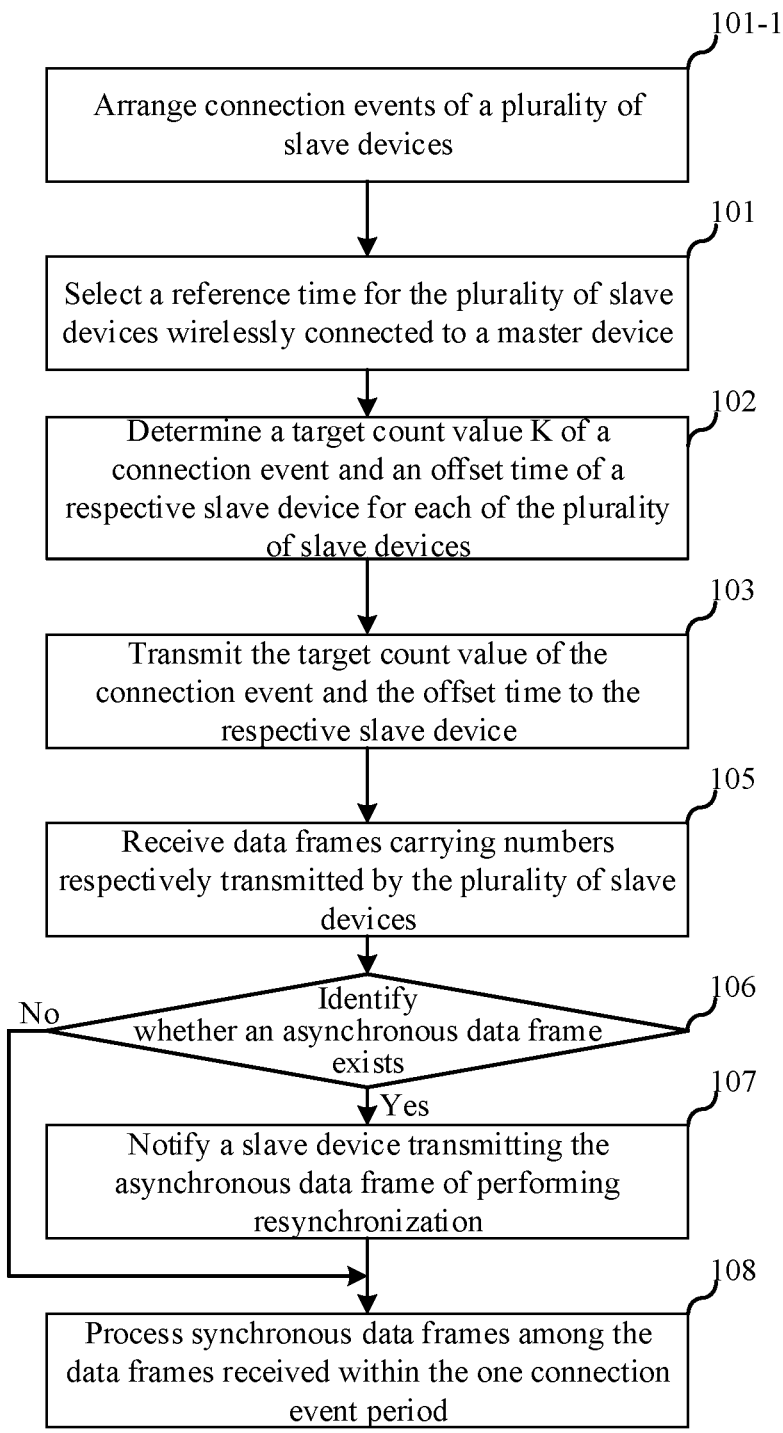
FIG. 18 is a flow chart showing a synchronization control method implemented by a master device according to a further embodiment of the present disclosure.

In an embodiment, as shown in FIG. 18, a synchronization control method implemented by a master device includes the following operations.

In 101-1, connection events of a plurality of slave devices are arranged according to a preset requirement. Herein, the preset requirement includes: connection event periods of the plurality of slave devices are equal, and the connection events of the plurality of slave devices do not conflict each other within each of the connection event periods.

In 101, a reference time is set for the plurality of slave devices wirelessly connected to the master device.

In 102, for each of the plurality of slave devices, a target count value K of a connection event and an offset time of a respective slave device are determined. Herein, an offset time of a slave device refers to a time difference between the reference time and a start time of a $K^{th}$ connection event of the slave device.

In 103, the target count value of the connection events and the offset time are respectively transmitted to the plurality of slave devices.

In 105, data frames carrying numbers and respectively transmitted by the plurality of slave devices are received. Herein, tasks of the plurality of slave devices include: transmitting the data frames carrying numbers to the master device in an order of the numbers.

In 106, whether an asynchronous data frame exists among data frames received within one connection event period is identified according to the numbers carried in the data frames. If yes, operations 107 and 108 are performed. If no, operation 108 is directly performed.

In 107, a slave device transmitting the asynchronous data frame is notified of performing resynchronization and operation 108 is performed.

In 108, synchronous data frames among the data frames received within the one connection event period are processed.

Figure 19:
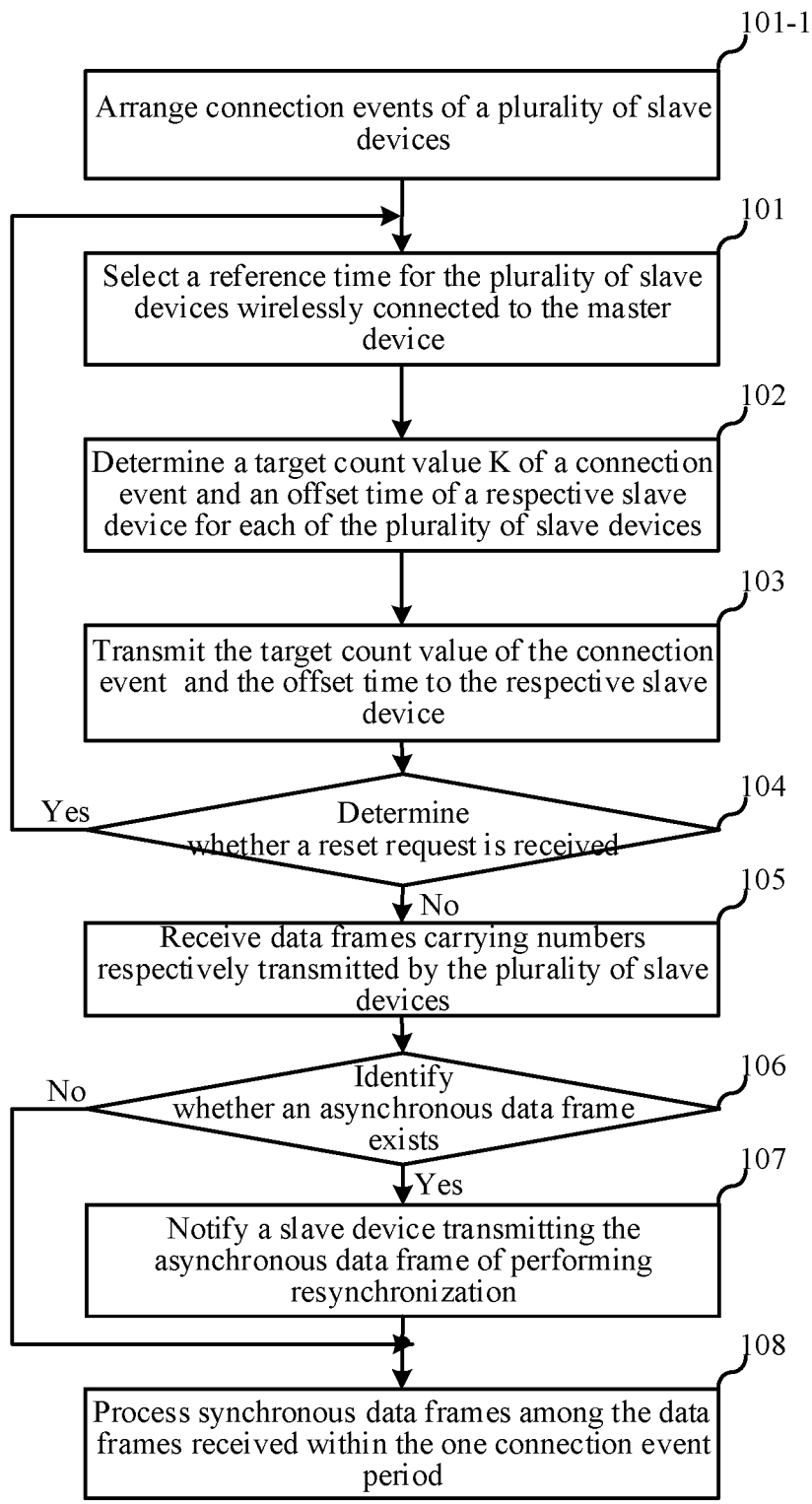
FIG. 19 is a flow chart showing a synchronization control method implemented by a master device according to still another embodiment of the present disclosure.

In an embodiment, as shown in FIG. 19, a synchronization control method implemented by a master device includes the following operations.

In 101-1, connection events of the plurality of slave devices are arranged according to a preset requirement. Herein, the preset requirement includes: connection event periods of the plurality of slave devices are equal, and the connection events of the plurality of slave devices do not conflict each other within each of the connection event periods.

In 101, a reference time is set for the plurality of slave devices wirelessly connected to the master device.

In 102, for each of the plurality of slave devices, a target count value K of a connection event and an offset time of a respective slave device are determined. Herein, an offset time of a slave device refers to a time difference between the reference time and a start time of a $K^{th}$ connection event of the slave device.

In 103, the target count value of the connection events and the offset time are respectively transmitted to the plurality of slave devices.

In 104, whether a reset request transmitted by at least one slave device is received is determined. If a determination result of operation 104 is yes, the above operations 101-103 are performed again. If the determination result of operation 104 is no, a data frame transmitted from the slave device is waited for reception.

In 105, data frames carrying numbers and respectively transmitted by the plurality of slave devices are received. Herein, tasks of the plurality of slave devices include: transmitting the data frames carrying numbers to the master device in an order of the numbers.

In 106, whether an asynchronous data frame exists among data frames received within one connection event period is identified according to the numbers carried in the data frames. If yes, operations 107 and 108 are performed. If no, only operation 108 is performed.

In 107, a slave device transmitting the asynchronous data frame is notified of performing resynchronization and operation 108 is performed.

In 108, synchronous data frames among the data frames received within the one connection event period are processed.

Figure 20:
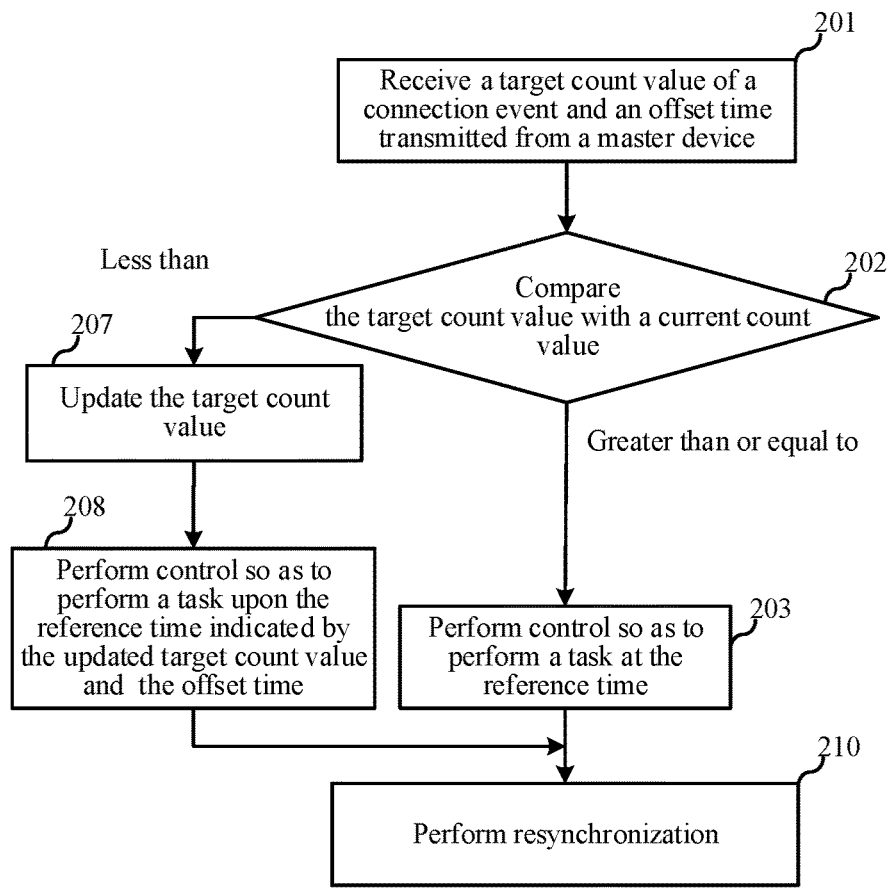
FIG. 20 is a flow chart showing a synchronization control method implemented by a slave device according to another embodiment of the present disclosure.

In an embodiment, as shown in FIG. 20, a synchronization control method implemented by a slave device includes the following operations.

In 201, a target count value K of a connection event and an offset time of the slave device transmitted from a master device is received. Herein, the offset time of the slave device refers to a time difference between a reference time pre-set by the master device and a start time of a $K^{th}$ connection event of the slave device.

In 202, the target count value of the connection event is compared with the current count value of the connection event. If the target count value is greater than or equal to the current count value, this indicates that the target count value received and the reference time indicated by an offset time are not overdue, and operation 203 is directly performed. If the target count value is less than the current count value, this indicates that the target count value received and the reference time indicated by the offset time are overdue, and operations 207 and 208 are performed.

In 203, control is performed based on the target count value of the connection event and the offset time when the reference time is not overdue, so as to perform a task at the reference time.

In 207, the target count value is updated according to the current count value to obtain an updated target count value. Herein, the updated target count value and the reference time indicated by the offset time are not overdue.

In 208, control is performed based on the updated target count value and the offset time, so as to perform the task upon the updated target count value and the reference time indicated by the offset time.

In 210, resynchronization is performed when the notification of resynchronization transmitted by the master device is received.

Figure 21:
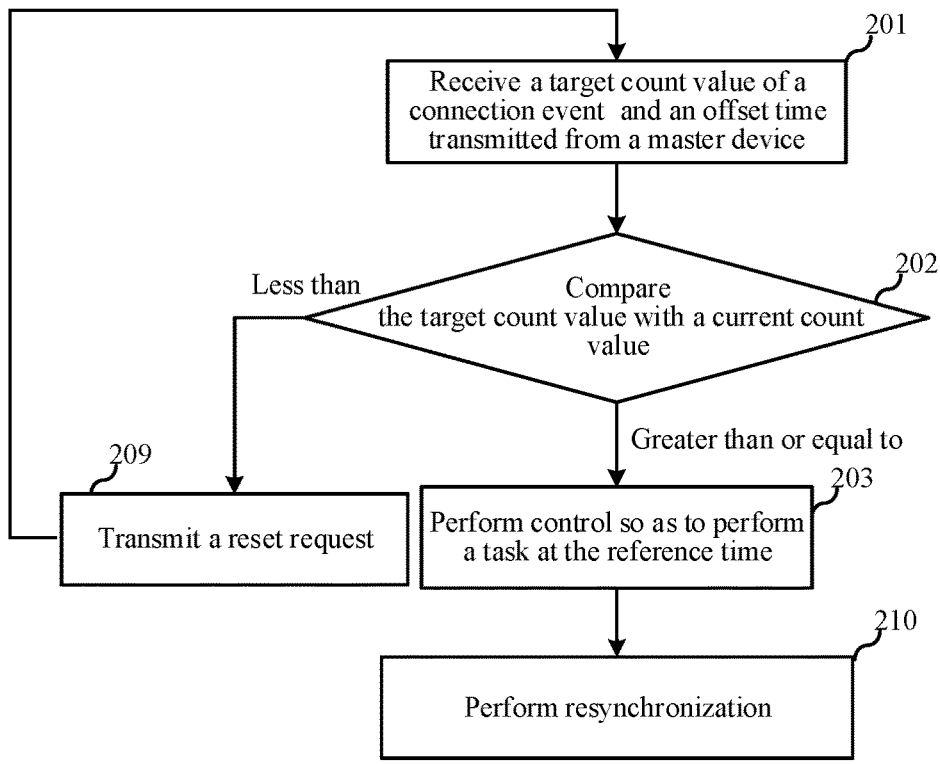
FIG. 21 is a flow chart showing a synchronization control method implemented by a slave device according to still another embodiment of the present disclosure.

In an embodiment, as shown in FIG. 21, a synchronization control method implemented by a slave device includes the following operations.

In 201, a target count value K of a connection event and an offset time of the slave device transmitted from a master device is received. Herein, an offset time of a slave device refers to a time difference between a reference time preset by the master device and a start time of a $K^{th}$ connection event of the slave device.

In 202, the target count value of the connection event is compared with a current count value of the connection event. If the target count value is greater than or equal to the current count value, this indicates that the target count value received and the reference time indicated by the offset time are not overdue, and operation 203 is directly performed. If the target count value is less than the current count value, this indicates that the target count value received and the reference time indicated by the offset time are overdue, and operation 209 is performed.

In 203, control is performed based on the target count value of the connection event and the offset time when the reference time is not overdue, so as to perform a task at the reference time.

In 209, a reset request is transmitted to the master device. The slave device waits to re-receive the target count value and the offset time transmitted by the master device, i.e., to return to operations 201 and 202. When the reference time is determined not to be overdue in 202, operations 203 and 210 are performed. Otherwise, operation 209 is re-performed. Herein, the slave device may preset a greatest wait length and then transmit the reset request. If the target count value and the offset time re-transmitted by the master device are not received after the greatest wait length, another reset request would be transmitted to the master device.

In 210, resynchronization is performed when the notification of resynchronization transmitted by the master device is received.

In an embodiment, a mater device interacts with a plurality of slave devices are as follows.

The master device sets a reference time for the plurality of slave devices wirelessly connected to the master device.

For each of the plurality of slave devices, the master device determines a target count value K of a connection event and an offset time of a respective slave device. Herein, an offset time of a slave device refers to a time difference between the reference time and a start time of a $K^{th}$ connection event of the slave device.

For each of the plurality of slave devices, the master device transmits the target count value K of the connection event and the offset time of the respective slave device to the slave device.

Each of the plurality of slave devices receives the target count value K of the connection event and the offset time of a respective slave device transmitted from the master device.

Each of the plurality of slave devices checks whether the reference time is overdue according to the target count value of the connection event. Control is performed based on the target count value of the connection event and the offset time when the reference time is not overdue, so as to perform a task at the reference time.

Herein, the operations in the embodiment are already described in detail in the operation processes of the slave devices and the master device and are not repeated.

In an embodiment, the mater device interacts with a plurality of slave devices are as follows.

The mater device selects one of the plurality of slave devices, sets a target count value K of a connection event of a selected slave device, setting an offset time of the selected slave device as zero. Herein, a start time of a $K^{th}$ connection event of the selected slave device is taken as a reference time.

For each unselected slave device in the plurality of slave devices, the mater device determines a target count value K of a connection event and an offset time of a respective unselected slave device. Herein, an offset time of an unselected slave device refers to a time difference between the reference time and a start time of a $K^{th}$ connection event of the unselected slave device.

For each of the plurality of slave devices, the mater device transmits the target count value K of the connection event and the offset time to a respective slave device.

Each of the plurality of slave devices receives the target count value K of the connection event and the offset time transmitted by the mater device.

Each of the plurality of slave devices checks whether the reference time is overdue according to the target count value of the connection event, and performs control based on the target count value of the connection event and the offset time when the reference time is not overdue, so as to perform a task at the reference time.

Herein, the operations in the embodiment are already described in detail in the operation processes of the plurality of slave devices and the master device and are not repeated.

Division of operations in the above methods is directed to facilitate clear description. The operations may be combined into one operation or some operations may be separated into a plurality of operations, which are included in the protection scope of the present disclosure as long as the same logic relationships are involved. Any trivial modification or design added to the algorithms or processes that does not change the algorithms or processes of the core design of the present disclosure is included in the protection scope of the present disclosure.

Figure 22:
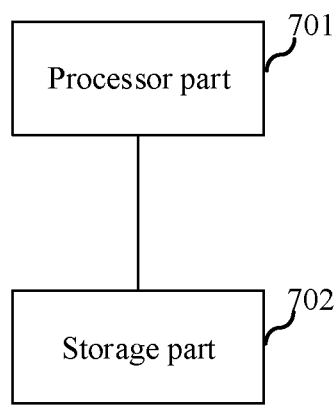
FIG. 22 is a schematic diagram showing a structure of a chip according to an embodiment of the present disclosure.

An embodiment of the present disclosure provides a chip. As shown in FIG. 22, the chip includes a processor part 701 and a storage part 702. The storage part 702 stores an instruction executable by the processor part 701. The instruction is executed by the processor part 701, to implement the above method embodiments. The chip may serve as a master device or a slave device.

Figure 23:
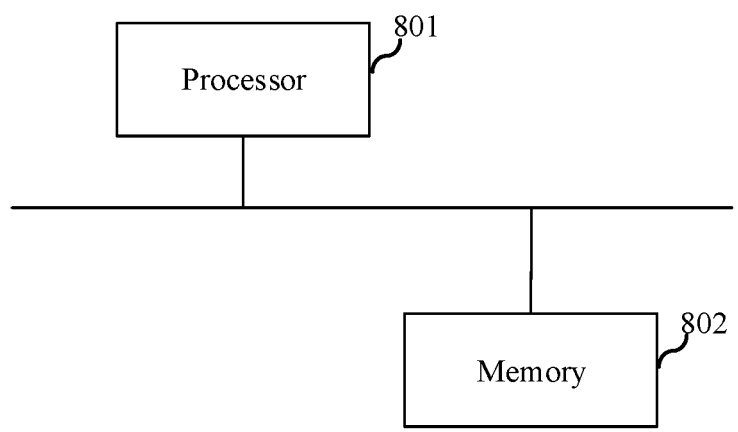
FIG. 23 is a schematic diagram showing a structure of an electronic device according to an embodiment of the present disclosure.

An embodiment of the present disclosure further provides an electronic device. As shown in FIG. 23, the electronic device includes at least one processor 801, and a memory 802 in communication connection with the at least one processor 801. Herein, the memory stores an instruction executable by the at least one processor 801. The instruction is executed by the at least one processor 801 to implement the above method embodiments. The electronic device may be a master device or a slave device.

Herein, the memory 802 and the at least one processor 801 are connected through a bus. The bus may include any number of buses and bridges interconnected. The bus connects one or more processors 801 with circuits of the memory 802. The bus may further connect various other circuits such as a peripheral device, a voltage regulator and a power management circuit. These are common knowledge in the existing technology, and are not further described. A bus interface provides an interface between the bus and a transceiver. The transceiver may be one or more elements, for example, multiple receivers and transmitters that provide units for communicating with other apparatuses on a transmission medium. Data processed by the at least one processor 801 are transmitted on wireless medium through an antenna. Further, the antenna receives data and transmits the data to the at least one processor 801.

The at least one processor 801 is responsible for managing the buses and general processing, and further provides varied functions including timing, controlling a peripheral interface, adjust a voltage and power management and other control functions. The memory 802 may be used to store data used by the at least one processor 801 when in operation.

An embodiment of the present disclosure further provides a computer-readable storage medium storing a computer program. The computer program, when executed by a processor, causes a processor to implement the method embodiments described in the above.

That is, those skilled in the art may understand that all or some operations in the method embodiments may be implemented by instructing hardware through a program. The program is stored in a storage medium. The program includes instructions that enable one device (which may be a single-chip microcomputer or a chip and the like) or processor to perform all or some operations of the methods of the embodiments. The storage medium as described above may be a medium such as a universal serial bus, a mobile hard disk, a read-only memory (ROM), a random access memory (RAM), a magnetic disk or an optical disk, that may store program codes.

Those of ordinary skill in the art may understand that the above embodiments are specific embodiments to implement the present disclosure. In practice, the embodiments may be modified in form and details without departing from the spirit and scope of the present disclosure.

What is claimed is:

1. A synchronization control method, applied to a master device, comprising: a computing operation and a transmission operation; wherein the computing operation comprises:
setting a reference time for a plurality of slave devices wirelessly connected to the master device;
for each of the plurality of slave devices, determining a target count value K of a connection event and an offset time of a respective slave device; wherein an offset time of a slave device refers to a time difference between the reference time and a start time of a $K^{th}$ connection event of the slave device;

the transmission operation comprises:
for each of the plurality of slave devices, transmitting the target count value K of the connection event and the offset time to a respective slave device, so that the respective slave device performs control based on the target count value K of the connection event and the offset time, so as to perform a task at the reference time.

2. The synchronization control method according to claim 1, wherein setting the reference time for the plurality of slave devices wirelessly connected to the master device comprises:
selecting one of the plurality of slave devices, setting a target count value K of a connection event of a selected slave device, setting an offset time of the selected slave device as zero; wherein a start time of a $K^{th}$ connection event of the selected slave device is taken as the reference time;
for each of the plurality of slave devices, determining the target count value K of the connection event and the offset time of the respective slave device comprises:
for each unselected slave device in the plurality of slave devices, determining a target count value K of a connection event and an offset time of a respective unselected slave device; wherein an offset time of an unselected slave device refers to a time difference between the reference time and a start time of a $K^{th}$ connection event of the unselected slave device.

3. The synchronization control method according to claim 2, wherein for each unselected slave device in the plurality of slave devices, determining the target count value K of the connection event and the offset time of the respective unselected slave device comprises:
computing a time difference between the reference time and a current time of the master device according to the target count value of the connection event that is already set for the selected slave device, a current count value of the connection event of the selected slave device and a connection event period of the selected slave device; and
computing the target count value K of the connection event and the offset time of the respective unselected slave device, according to the time difference between the reference time and the current time of the master device, a connection event period of the respective unselected slave device, a current count value of the connection event of the respective unselected slave device;
wherein in response to the reference time being later than the current time of the master device, for each unselected slave device, the target count value of the connection event is a sum of the current count value of the connection event and a quotient obtained by dividing the time difference between the reference time and the current time of the master device with the connection event period of the respective unselected slave device; and the offset time is a remainder obtained by dividing the time difference between the reference time and the current time of the master device with the connection event period of the respective unselected slave device.

4. The synchronization control method according to claim 1, wherein the reference time is randomly set.

5. The synchronization control method according to claim 1, wherein before determining the target count value K of the connection event and the offset time of the respective slave device for each of the plurality of slave devices, or before determining the target count value K of the connection event and the offset time of the respective unselected slave device for each unselected slave device in the plurality of slave devices, the method further comprises:
arranging connection events of the plurality of slave devices according to a preset requirement;
wherein the preset requirement comprises: connection event periods of the plurality of slave devices being equal, and the connection events of the plurality of slave devices occurring at different times within each of connection event periods of the master device.

6. The synchronization control method according to claim 5, wherein after the transmission operation, the method further comprises:
receiving data frames carrying numbers separately transmitted from the plurality of slave devices; wherein tasks performed by the plurality of slave devices comprise: transmitting the data frames carrying numbers to the master device in sequence based on the numbers;
identifying whether an asynchronous data frame exists among data frames received within one connection event period according to the numbers carried in the data frames;
in response to the asynchronous data frame existing among the data frames received within the one connection event period, performing one or both of following operations:
notifying a slave device transmitting the asynchronous data frame of performing resynchronization; and
processing synchronous data frames among the data frames received within the one connection event period.

7. The synchronization control method according to claim 6, wherein notifying the slave device transmitting the asynchronous data frame of performing resynchronization comprises:
notifying the slave device transmitting the asynchronous data frame of discarding a data frame stored in a cache region.

8. The synchronization control method according to claim 1, wherein the computing operation is triggered and performed in response to:
connection being respectively established between the master device and the plurality of slave devices; or
the master device receiving a reset request transmitted from at least one of the plurality of slave devices, wherein the reset request is transmitted in response to a slave device receiving the target count value K of the connection event and the offset time transmitted from the master device and the reference time being checked to be overdue according to the target count value of the connection event.

9. The synchronization control method according to claim 1, wherein determining the target count value K of the connection event and the offset time of the respective slave device for each of the plurality of slave devices comprises:
for each of the plurality of slave devices,
acquiring a pre-stored connection establishment time of the respective slave device, and computing a time difference between the connection establishment time and the reference time; the connection establishment time referring to a time of establishing connection between the respective slave device and the master device;
computing the target count value K of the connection event and the offset time of the respective slave device according to the time difference between the connection establishment time and the reference time and a connection event period of the respective slave device;
in response to the reference time being later than a current time of the master device, for each of the plurality of slave devices, the target count value of the connection event is a sum of a current count value of the connection event of the respective slave device and a quotient obtained by dividing the time difference between the connection establishment time and the reference time with the connection event period of the respective slave device; and the offset time is a remainder obtained by dividing the time difference between the connection establishment time and the reference time with the connection event period of the respective slave device.

10. The synchronization control method according to claim 1, wherein the reference time is later than a current time of the master device; the reference time is equal to or later than start times of the $K^{th}$ connection event of each of the plurality of slave devices, and the offset time of each of the plurality of slave devices is less than the connection event period of the respective slave device.

11. The synchronization control method according to claim 10, wherein the time difference between the reference time and the current time of the master device is greater than or equal to the connection event period of each of the plurality of slave devices.

12. A synchronization control method, applied to a slave device, comprising:
receiving a target count value K of a connection event and an offset time of the slave device transmitted from a master device; wherein the offset time of the slave device refers to a time difference between a reference time preset by the master device and a start time of a $K^{th}$ connection event of the slave device;
checking whether the reference time is overdue according to the target count value of the connection event;
performing control based on the target count value of the connection event and the offset time in response to the reference time being not overdue, so as to perform a task at the reference time.

13. The synchronization control method according to claim 12, wherein performing the task comprises: collecting data frames under control of a local sampling clock; and the method further comprises:
acquiring an actual pulse number of the local sampling clock within L connection event periods of the slave device; L being an integer greater than or equal to 1;
identifying whether the local sampling clock has deviation according to the actual pulse number and an ideal pulse number of the local sampling clock within the L connection event periods; the ideal pulse number being determined by a sampling frequency of the local sampling clock, the connection event period and a value of L;
calibrating the local sampling clock in response to the local sampling clock being identified to have deviation.

14. The synchronization control method according to claim 12, wherein performing the task comprises: collecting data frames under control of a local sampling clock, transmitting collected data frames to the master device in sequence, and directly discarding a current data frame after the current data frame is transmitted.

15. The synchronization control method according to claim 12, wherein performing the task comprises: collecting data frames under control of a local sampling clock, numbering collected data frames, transmitting the collected data frames carrying numbers to the master device in sequence, and
performing resynchronization in response to receiving a notification of resynchronization transmitted by the master device;
wherein the notification of resynchronization is transmitted, in response to the master device identifying that there is an asynchronous data frame among data frames received within one connection event period according to the numbers carried in the data frames, from the master device to a slave device transmitting the asynchronous data frame.

16. The synchronization control method according to claim 15, wherein performing resynchronization comprises: discarding a data frame stored in a cache region.

17. The synchronization control method according to claim 12, wherein the reference time is equal to or later than the start time of the $K^{th}$ connection event of the slave device, and the offset time of the slave device is less than the connection event period of the slave device; and checking whether the reference time is overdue according to the target count value of the connection event comprises:
comparing the target count value of the connection event with a current count value of the connection event; wherein the target count value being greater than or equal to the current count value indicates that the reference time not being overdue.

18. The synchronization control method according to claim 12, wherein the method further comprises:
in response to the reference time being overdue, performing one or both of following operations:
updating the target count value according to the current count value to obtain an updated target count value and performing control based on the updated target count value and the offset time, so as to perform the task upon the reference time indicated by the updated target count value and the offset time; wherein a reference time indicated by the updated target count value and the offset time is not overdue; and
transmitting a reset request to the master device and receiving a new target count value and a new offset time of the connection event, which are re-determined by the master device in response to the master device receiving the reset request.

19. The synchronization control method according to claim 18, wherein updating the target count value according to the current count value to obtain an updated target count value comprises:
computing a difference between the current count value and the target count value before update, and taking a sum of the current count value and the difference as the updated target count value.

20. A chip, comprising: a processor part and a storage part; the storage part storing an instruction executable by the processing module; and the instruction, when executed by the processor part, causes the processor part to implement:
in response to the chip serving as a master device, a synchronization control method comprising: a computing operation and a transmission operation; wherein
the computing operation comprises:
setting a reference time for a plurality of slave devices wirelessly connected to the master device;
for each of the plurality of slave devices, determining a target count value K of a connection event and an offset time of a respective slave device; wherein an offset time of a slave device refers to a time difference between the reference time and a start time of a $K^{th}$ connection event of the slave device;
the transmission operation comprises:
for each of the plurality of slave devices, transmitting the target count value K of the connection event and the offset time to a respective slave device, so that the respective slave device performs control based on the target count value K of the connection event and the offset time, so as to perform a task at the reference time; and in response to the chip serving as a slave device, a synchronization control method comprising:

receiving a target count value K of a connection event and an offset time of the slave device transmitted from a master device; wherein the offset time of the slave device refers to a time difference between a reference time preset by the master device and a start time of a $K^{th}$ connection event of the slave device;

checking whether the reference time is overdue according to the target count value of the connection event;

performing control based on the target count value of the connection event and the offset time in response to the reference time being not overdue, so as to perform a task at the reference time.

* * * * *